US 8,005,320 B2

(12) United States Patent
Nakayama et al.

(10) Patent No.: US 8,005,320 B2
(45) Date of Patent: Aug. 23, 2011

(54) IMAGE PICKUP APPARATUS, SOLID-STATE IMAGING DEVICE, AND IMAGE GENERATING METHOD

(75) Inventors: Masaaki Nakayama, Osaka (JP); Shinobu Fusa, Osaka (JP); Ichiro Kitao, Osaka (JP); Kenji Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 65 days.

(21) Appl. No.: 12/633,373

(22) Filed: Dec. 8, 2009

(65) Prior Publication Data

US 2010/0085464 A1   Apr. 8, 2010

Related U.S. Application Data

(63) Continuation of application No. 11/531,892, filed on Sep. 14, 2006, now Pat. No. 7,653,266.

(30) Foreign Application Priority Data

Sep. 14, 2005   (JP) .................................. 2005-266532

(51) Int. Cl.
*G06K 7/00* (2006.01)
*H04N 5/222* (2006.01)
*H04N 7/01* (2006.01)
*H04N 5/335* (2011.01)

(52) U.S. Cl. ..................... 382/312; 348/333.08; 348/445

(58) Field of Classification Search .......... 382/312–314, 382/188, 282; 345/156, 169, 179, 419, 660, 345/698; 348/207.99, 208, 222.1, 294, 302, 348/333.01, 333.05, 333.08, 333.11, 335, 348/362, 445, 556, E5.022, E5.024

See application file for complete search history.

(56) References Cited

U.S. PATENT DOCUMENTS 5,746,599 A * 5/1998 Lechner .......................... 434/44
(Continued)

FOREIGN PATENT DOCUMENTS

JP   6-86114   3/1994

*Primary Examiner* — Amir Alavi

(74) *Attorney, Agent, or Firm* — Hamre, Schumann, Mueller & Larson, P.C.

(57) ABSTRACT

In an image pickup apparatus of the present invention, a CCD 11 in which a plurality of pixels are arranged in a two-dimensional array, thereof the number of effective horizontal pixels is H and the number of effective vertical pixels is V; a aspect switching operator 18 that sets one of a plurality of aspect modes including a first aspect mode and a second aspect mode; an image processor 141 that generates first image data for recording in the first aspect mode, and generates second image data for recording in the second aspect mode, wherein the first image data for recording is generated using image data that is generated with pixels being H1 horizontal pixels by V1 vertical pixels included in the pixels on the CCD 11 or image data that is obtained by subjecting said image data to predetermined processing, the second image data for recording is generated using image data that is generated with pixels being H2 horizontal pixels by V2 vertical pixels included in the pixels on the solid-state imaging device or image data that is obtained by subjecting said image data to predetermined processing, and the first image data for recording and the second image data for recording satisfy the following relationships: $H2<H1\leq H$, and $V1<V2\leq V$. Thus, it is possible to make the sizes or qualities of sets of image data for recording close to each other even if they have different aspect modes.

4 Claims, 18 Drawing Sheets

U.S. PATENT DOCUMENTS

| | | |
|---|---|---|
| 6,469,739 B1 | 10/2002 | Bechtel et al. |
| 6,768,821 B2 | 7/2004 | Silverbrook et al. |
| 6,999,117 B2 | 2/2006 | Yamazaki |
| 7,102,615 B2 * | 9/2006 | Marks ............................ 345/156 |
| 7,136,101 B2 | 11/2006 | Pyle |
| 7,158,158 B1 * | 1/2007 | Fleming et al. ................ 345/698 |
| 7,187,415 B2 * | 3/2007 | Arora ............................. 348/445 |
| 7,391,453 B2 | 6/2008 | Ohkawa |
| 7,551,806 B2 * | 6/2009 | Wang et al. .................... 382/300 |
| 7,616,248 B2 * | 11/2009 | Parulski et al. ........... 348/333.11 |
| 7,653,266 B2 * | 1/2010 | Nakayama et al. ............ 382/312 |
| 2002/0089593 A1 | 7/2002 | Tabata |
| 2004/0017401 A1 * | 1/2004 | Strong et al. ................... 345/821 |
| 2004/0165075 A1 | 8/2004 | Okada et al. |
| 2005/0062875 A1 | 3/2005 | Ojima |
| 2006/0009286 A1 * | 1/2006 | Durham et al. .................. 463/30 |
| 2007/0058061 A1 | 3/2007 | Nakayama et al. |
| 2007/0291052 A1 * | 12/2007 | van der Meulen ............. 345/660 |
| 2010/0085464 A1 * | 4/2010 | Nakayama et al. ....... 348/333.08 |

\* cited by examiner

IMAGE PICKUP APPARATUS, SOLID-STATE IMAGING DEVICE, AND IMAGE GENERATING METHOD

This application is a continuation of application Serial No. U.S. Ser. No. 11/531,892, filed Sep. 14, 2006, now U.S. Pat. No. 7,653,266 which application is incorporated herein by reference.

BACKGROUND OF THE INVENTION

1. Field of the Invention

The present invention relates to an image pickup apparatus capable selecting one of a plurality of different aspect ratios to record image data.

2. Description of Related Art

An image pickup apparatus capable of recording image data having different aspect ratios is disclosed in JP 6 (1994)-086114A, for example. The image pickup apparatus disclosed in JP 6 (1994)-086114A is an image pickup apparatus to which an optical system including an anamorphic lens for converting the aspect ratio of captured images can be mounted, wherein, when image-taking is performed after mounting the optical system, the parameters of the circuit involved in acquiring image pick-up signals (image signals) are corrected according to the aspect ratio transfer characteristics of the optical system. This provides an image pickup apparatus capable of taking images having various aspect ratios, and always maintaining a certain level of controlling capability and image quality at the time of image-taking for images of all aspect ratios Although not described in a published document, the applicant recognizes techniques shown in FIG. 15 and FIG. 16 as related arts. FIG. 15 is a diagram showing the relationship among use regions on a solid-state imaging device in an image pickup apparatus of Related Art 1. FIG. 16 is a diagram schematically showing the relationship between use regions on a solid-state imaging device in an image pickup apparatus of Related Art 2. Here, a "use region" means a pixel area on a solid-state imaging device for generating image data that is used when generating image data for recording.

In FIG. 15, use region E101 is the use region in a 16:9 mode, and its height is represented by V101. Use region E102 is the use region in a 3:2 mode, and its height is represented by V102. Use region E103 is a use region in a 4:3 mode, and its height is represented by V103. The relationship among V101 to V103 is as follows:

$$V101 < V102 < V103 \quad \text{(Formula 101)}$$

In addition, the widths of the use regions are all H100 and equal. That is, according to Related Art 1, the widths of all the use regions having aspect ratios that are different from one another are set to be equal, and their heights are set to be different from one another.

In FIG. 16, use region E111 is the use region in the 16:9 mode, and its width is represented by H111. Use region E112 is the use region in the 3:2 mode, and its width is represented by H112. Use region E113 is the use region in the 4:3 mode, and its width is represented by H113. The relationship among H111 to H113 is as follows:

$$H113 < H112 < H111 \quad \text{(Formula 102)}$$

In addition, the widths of the use regions are all V110 and equal. That is, according to Related Art 2, the heights of all the regions having aspect ratios that are different from one another are set to be equal, and the widths thereof are set to be different from one another.

As described above, according to Related Arts 1 and 2, the image data corresponding respectively to the aspect ratios are extracted from the solid-state imaging device and subjected to image processing, so that it is possible to obtain image data for recording having different aspect ratios relatively easily.

However, although the image pickup apparatus described in JP 6 (1994)-086114A has an effect of always maintaining a certain level of control capability and image quality at the time of image-taking for images of all aspect ratios, this requires mounting of an anamorphic lens. Accordingly, the image pickup apparatus described in JP 6 (1994)-086114A has a problem in that it requires a complicated operation, and also in that it has a cost disadvantage due to the large number of required components.

Furthermore, with the image pickup apparatuses of Related Arts 1 and 2, there will be differences in size among data constituting images having different aspect ratios. That is, according to Related Art 1, the size of the image data output from the solid-state imaging device is largest when the aspect ratio is 4:3, and smallest when the aspect ratio is 16:9. The reason that there are differences in data size in this way is that the numbers of pixels in the use regions (E101 to E103) differ among the aspect ratios. This is also true in Related Art 2. This means that the number of pixels of the image data read from the solid-state imaging device differs for each aspect ratio, so that when the same image processing is performed for image data having various aspect ratios, the size of the image data for recording varies depending on the aspect ratio. On the other hand, when different image processes are performed for image data having various aspect ratios to make their image data sizes uniform, the image quality of the image data for recording varies depending on the aspect ratio. Therefore, the image pickup apparatuses according to Related Arts 1 and 2 have a problem in that when images have different aspect ratios, there will be differences in size among the data constituting the images, and hence the sizes or qualities of the images for recording vary.

Furthermore, with the image pickup apparatuses of Related Arts 1 and 2, the diagonal angle of view greatly varies among images having various aspect ratios. Therefore, it is necessary to design the size of the effective image circle of the lens so as to be suitable for images having a large diagonal angle of view, so that the effective image circle of the lens will be unnecessarily large for images having a small diagonal angle of view. This poses a problem that the effective image circle of the lens cannot be utilized efficiently for images having a small diagonal angle of view. This problem tends to occur especially in image pickup apparatuses provided with a solid-state imaging device having a rectangular image-taking region, such as a CCD image sensor or a MOS image sensor. In contrast, this problem tends not to occur in image pickup apparatuses provided with a camera tube having a circular image-taking region.

SUMMARY OF THE INVENTION

It is an object of the present invention to provide an image pickup apparatus that can make the sizes or qualities of images for recording close to each other even if the images have different aspect modes. It is another object of the present invention to provide an image pickup apparatus that can utilize the effective image circle of a lens efficiently. It is yet another object of the present invention to provide a solid-state imaging device that can be used for such an image pickup apparatus. It is a further object of the present invention to provide an image generating method that can be used for the above-described image pickup apparatus and solid-state imaging device.

In order to achieve the above-described objects, a first image pickup apparatus according to the present invention includes: a solid-state imaging device in which a plurality of pixels are arranged in a two-dimensional array, thereof the number of effective horizontal pixels is H and the number of effective vertical pixels is V; a mode setting portion that sets one of a plurality of aspect modes including a first aspect mode and a second aspect mode; and an image processor that generates first image data for recording in the first aspect mode, and generates second image data for recording in the second aspect mode, wherein the first image data for recording is generated using image data that is generated with pixels being H1 horizontal pixels by V1 vertical pixels included in the pixels on the solid-state imaging device or image data that is obtained by subjecting said image data to predetermined processing, the second image data for recording is generated using image data that is generated with pixels being H2 horizontal pixels by V2 vertical pixels included in the pixels on the solid-state imaging device or image data that is obtained by subjecting said image data to predetermined processing, and the first image data for recording and the second image data for recording satisfy the following relationships: H2<H1≦H, and V1<V2≦V.

Furthermore, a second image pickup apparatus according to the present invention includes: a solid-state imaging device in which a plurality of effective pixels are arranged in a two-dimensional array; an image processor that generates image data for recording using image data that is generated with a portion or all of the effective pixels on the solid-state imaging device or image data that is obtained by subjecting said image data to predetermined processing; a bracket setting portion that can set the image pickup apparatus in an aspect bracketing mode; and a receiver that receives an instruction to start image-taking, wherein, when the receiver receives an instruction to start image-taking in a case in which the aspect bracketing mode is set by the bracket setting portion, the image processor generates a plurality of image data for recording having aspect ratios that are different from one another.

Furthermore, a solid-state imaging device according to the present invention is an solid-state imaging device in which a plurality of pixels are arranged in a two-dimensional array, thereof the number of effective horizontal pixels is H and the number of effective vertical pixels is V, the solid-state imaging device being capable of setting one of a plurality of aspect modes including a first aspect mode and a second aspect mode, outputting, when the first aspect mode is set, first image data that is generated with pixels being H1 horizontal pixels by V1 vertical pixels, and outputting, when the second aspect mode is set, second image data that is generated with pixels being H2 horizontal pixels by V2 vertical pixels, wherein the first image data and the second image data satisfy the following relationships:

H2<H1≦H, and

V1<V2≦V.

Furthermore, a first image generating method according to the present invention is an image generating method for generating image data for recording using a solid-state imaging device in which a plurality of pixels are arranged in a two-dimensional array, thereof the number of effective horizontal pixels is H and the number of effective vertical pixels is V, the method including: setting one of a plurality of aspect modes including a first aspect mode and a second aspect mode; generating, in the first aspect mode, first image data for recording using image data that is generated with pixels being H1 horizontal pixels by V1 vertical pixels included in the pixels on the solid-state imaging device or image data that is obtained by subjecting said image data to predetermined processing, and generating, in the second aspect mode, second image data for recording using image data that is generated with pixels being H2 horizontal pixels by V2 vertical pixels included in the pixels on the solid-state imaging device or image data that is obtained by subjecting said image data to predetermined processing, wherein the first image data for recording and the second image data for recording satisfy the following relationships:

H2<H1≦H, and

V1<V2≦V.

Furthermore, a second image generating method according to the present invention is an image generating method for generating image data for recording using a solid-state imaging device in which a plurality of effective pixels are arranged in a two-dimensional array, the method including: setting an aspect bracketing mode; receiving an instruction to start image-taking; and generating a plurality of image data for recording having aspect ratios that are different from one another using image data that is generated with a portion or all of the effective pixels on the solid-state imaging device or image data that is obtained by subjecting said image data to predetermined processing.

DETAILED DESCRIPTION OF THE INVENTION

Figure 1:
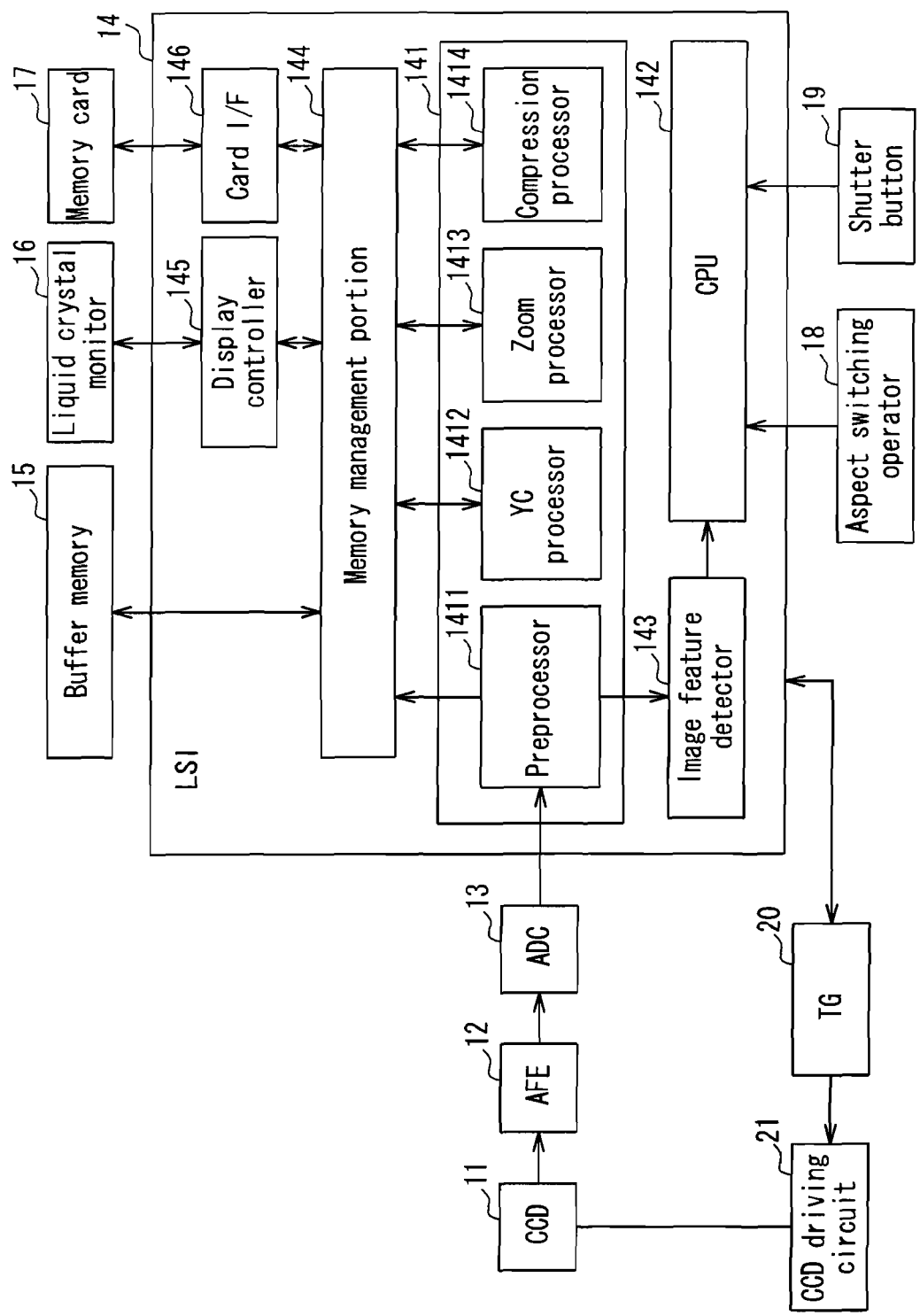
FIG. 1 is a block diagram showing a configuration of an image pickup apparatus according to Embodiments 1 to 3 of the present invention.

Hereinafter, the present invention will be described by way of illustrative embodiments with reference to the drawings.

In the image pickup apparatus according to the present invention, diagonal length φ1 of the pixels being H1 horizontal pixels by V1 vertical pixels and diagonal length φ2 of the pixels being H2 horizontal pixels by V2 vertical pixels may satisfy the following relationship:

$$\phi1 \approx \phi2.$$

This makes it easy to determine a pixel region on the solid-state imaging device for generating image data that is used when generating image data for recording. Furthermore, since the diagonal angles of view of images having the various aspect ratios are made substantially constant, it is possible to utilize the effective image circle of a lens efficiently even if the aspect mode is switched.

Furthermore, the first image data for recording and the second image data for recording may satisfy the following relationships:

$$H1/V1 \approx 16/9, \text{ and}$$

$$H2/V2 \approx 4/3.$$

This makes it possible to make the numbers of pixels on the solid-state imaging device for generating image data that is used when generating image data for recording having aspect ratios of 16:9 and 4:3 close to each other.

Furthermore, the solid-state imaging device may output the image data generated with the pixels being H1 horizontal pixels by V1 vertical pixels in the first aspect mode to the image processor, and output the image data generated with the pixels being H2 horizontal pixels by V2 vertical pixels in the second aspect mode to the image processor. This makes it possible to obtain image data having an aspect ratio corresponding to the aspect mode upon reading image data from the solid-state imaging device, thus eliminating unnecessary to the image processing.

Furthermore, a buffer memory that temporarily stores image data that is generated with the plurality of pixels that the number of effective horizontal pixels is H and the number of effective vertical pixels is V on the solid-state imaging device or image data that is obtained by subjecting this image data to predetermined processing further may be provided. In this case, the image processor may generate the first image data for recording in the first aspect mode by reading image data that corresponds to the pixels being H1 horizontal pixels by V1 vertical pixels from the image data stored in the buffer memory, and generate the second image data for recording in the second aspect mode by reading image data that corresponds to the pixels being H2 horizontal pixels by V2vertical pixels from the image data stored in the buffer memory.

By doing so, the image data of the entire effective pixel region is read from the solid-state imaging device, so that it is not necessary to perform a complicated control for reading image data from the solid-state imaging device. Accordingly, it is possible to read image data from the solid-state imaging device easily.

Furthermore, the mode setting portion further can set a third aspect mode, the image processor may generate, in the third aspect mode, third image data for recording using image data that is generated with pixels being H3 horizontal pixels by V3 vertical pixels included in the pixels on the solid-state imaging device or image data that is obtained by subjecting this image data to predetermined processing, and the first image data for recording, the second image data for recording and the third image data for recording may satisfy the following relationships:

$$H2 < H3 < H1 \leq H, \text{ and}$$

$$V1 < V3 < V2 \leq V.$$

This makes it possible to make the numbers of pixels on the solid-state imaging device for generating image data that is used when generating image data for recording having different aspect modes close to one another even if there are three or more aspect modes.

Furthermore, in this case, diagonal length φ1 of the pixels being H1 horizontal pixels by V1 vertical pixels, a diagonal length φ2 of the pixels being H2 horizontal pixels by V2vertical pixels and a diagonal length φ3 of the pixels being H3 horizontal pixels by V3 vertical pixels may satisfy the following relationship:

$$\phi1 \approx \phi2 \approx \phi3.$$

This makes it possible to determine readily a pixel region on the solid-state imaging device for generating image data that is used when generating image data for recording. Furthermore, since the diagonal angles of view of images having various aspect ratios are made substantially constant, it is possible to utilize the effective image circle of a lens efficiently even if the aspect mode is switched.

Furthermore, the first image data for recording, the second image data for recording and the third image data for recording may satisfy the following relationships:

$$H1/V1 \approx 16/9$$

$$H2/V2 \approx 4/3, \text{ and}$$

$$H3/V3 \approx 3/2.$$

This makes it possible to make the numbers of pixels on the solid-state imaging device for generating image data that is used when generating image data for recording having aspect ratios 16:9, 4:3 and 3:2 close to each other.

In the second image pickup apparatus according to the present invention, a buffer memory that temporarily stores image data that is generated with the plurality of pixels on the solid-state imaging device or image data that is obtained by subjecting this image data to predetermined processing further may be included, wherein, when the receiver receives an instruction to start image-taking in a case in which the aspect bracketing mode is set by the bracket setting portion, the image processor may generate a plurality of image data for recording having aspect ratios that are different from one another by respectively reading image data that correspond to pixel arrays having a plurality of aspect ratios from the image data stored in the buffer memory.

Furthermore, the first image pickup apparatus further includes a display portion that includes a displayable region in which the number of effective horizontal pixels is PH and the number of effective vertical pixels is PV, and that displays image data that is generated with the solid-state imaging device or image data that is obtained by subjecting this image data to predetermined processing; and a display controller that generates first image data for display in the first aspect mode and generates second image data for display in the second aspect mode, wherein the first image data for display is generated by processing image data that is generated with the solid-state imaging device or image data that is obtained by subjecting this image data to predetermined processing in such a manner that these image data are displayed in a region being PH1 horizontal pixels by PV1 vertical pixels included in the displayable region of the display portion, the second image data for display is generated by processing image data that is generated with the solid-state imaging device or image data that is obtained by subjecting this image data to predetermined processing in such a manner that these image data are displayed in a region being PH2 horizontal pixels by PV2 vertical pixels included in the displayable region of the display portion, and the first image data for display and the second image data for display satisfy the following relationships:

$$PH2 < PH1 \leq PH, \text{ and}$$

$$PV1 < PV2 \leq PV.$$

As described above, with the first image pickup apparatus according to the present invention, it is possible to make the sizes or qualities of images for recoding close to each other with a simple configuration, even if they have different aspect modes. This is convenient, because a user easily can predict the sizes or qualities of images for recording when taking images having various aspect ratios. Moreover, it is possible to utilize the effective image circle of a lens efficiently.

Furthermore, with the second image pickup apparatus according to the present invention, it is possible to perform bracketing shooting in terms of aspect ratios, thus making it possible to select the image having the aspect ratio suitable, for the photographic subject after taking images. Accordingly, it is possible to perform image-taking with few failures.

Embodiment 1

1-1. Configuration 1-1-1. Apparatus Configuration

A digital camera 100 according to Embodiment 1 of the present invention can select among different aspect modes, and take image data having an aspect ratio corresponding to the selected mode. For example, the digital camera 100 can select among, for example, 16:9, 3:2 and 4:3 aspect modes. When the digital camera 100 selects the 16:9 aspect mode, it stores image data having an aspect ratio of 16:9 as image data for recording in a memory card 17.

FIG. 1 is a block diagram showing a configuration of the digital camera 100 according to Embodiment 1 of the present invention. As shown in FIG. 1, the digital camera 100 includes a CCD (charge coupled device) image sensor (hereinafter, simply referred to as "CCD") 11, an analog front end portion (hereinafter, referred to as "AFE") 12, an analog to digital converter (hereinafter, simply referred to as "ADC") 13, an LSI (large-scale integration) circuit (hereinafter, simply referred to as "LSI") 14, a buffer memory 15, a liquid crystal monitor 16, a memory card 17, an aspect switching operator 18, a shutter button 19, a timing generator (hereinafter, referred to as "TG") 20 and a CCD driving circuit 21.

The CCD 11 is a solid-state imaging device in which a plurality of pixels are arranged in a two-dimensional array. The CCD 11 outputs image data generated with the pixels. The AFE 12 is a kind of amplifier that performs noise canceling processing called "CDS" on the image data output from the CCD 11. The ADC 13 converts the image data output from the AFE 12 from a signal in analog format into a signal in a digital format.

The LSI 14 includes an image processor 141, a CPU (central processing unit) 142, an image feature detector 143, a memory management portion 144, a display controller 145 and a card I/F 146.

The image processor 141 generates image data for recording using image data that is generated with the pixels on the CCD 11 or image data that is obtained by subjecting this image data to predetermined processes with the AFE 12 and the ADC 13. The image processor 141 includes a preprocessor 1411, a YC processor 1412, a zoom processor 1413 and a compression processor 1414.

The preprocessor 1411 performs black balance correction and the like on the image data output from the ADC 13. The image data processed with the preprocessor 1411 is stored temporarily in the buffer memory 15 via the memory management portion 144.

The YC processor 1412 performs YC processing on the image data stored in the buffer memory 15 to generate image data including a YC signal.

The zoom processor 1413 converts the resolution of the image data subjected to YC processing. The zoom processor 1413 performs so-called electronic zoom processing. Accordingly, the image can be enlarged or reduced. In addition, the resolution conversion of the image data also may be performed by decimation processing, interpolation processing, or both decimation processing and interpolation processing.

The compression processor 1414 performs compression processing on the image data subjected to YC processing with the YC processor 1412, or the image data whose resolution has been converted with the zoom processor 1413. The format for the compression processing may be JPEG compression format, for example.

The CPU 142 (controller) is constituted by a microcomputer or the like, and controls the entire digital camera 100 based on instructions received by the operator such as the shutter button 19 and the aspect switching operator 18. For example, when the shutter button 19 is half-pressed, the CPU 142 calculates an estimated value for automatic focusing, based on the features of the image that is detected by the image feature detector 143.

The memory management portion 144 manages writing and reading to and from the buffer memory 15, and also manages input and output to and from the processing portions 1411 to 1414 in the image processor 141. Thus, the image processing using the buffer memory 15 in the image processor 141 can be performed smoothly, and the processing is expected to be performed promptly.

The display controller 145 controls display on the liquid crystal monitor 16.

The card I/F 146 is an interface with the memory card 17. The card I/F 146 carries out control for writing data to the memory card 17 and for reading data from the memory card 17.

The buffer memory 15 (storing portion) includes a semiconductor memory such as a DRAM or a flash memory. The buffer memory 15 temporarily stores the image data processed with the image processor 141 to assist in processing with the image processor 141.

The liquid crystal monitor 16 displays the image data generated with the CCD 11 or image data that is obtained by subjecting this image data to predetermined processing. In addition, the liquid crystal monitor 16 can display the image data stored in the memory card 17. Further, the liquid crystal monitor 16 can display various kinds of information used for operation by the user.

The memory card 17 can store the image data for recording generated with the image processor 141.

The aspect switching operator 18 (mode setting portion) can switch between a mode that can be set to an aspect ratio of 16:9, a mode that can be set to an aspect ratio of 3:2 and a mode that can be set to an aspect ratio of 4:3, and can set one of these modes. The aspect switching operator 18 also may be constituted by a mechanical setting portion such as a rotary dial or a slide switch. The aspect switching operator 18 also may be displayed on the liquid crystal monitor 16 for setting.

The TG 20 is a timing generator that generates a timing signal. The TG 20 generates a timing signal under control by the LSI 14. The timing signal generated with the TG 20 is input to the CCD driving circuit 21 and used for controlling the CCD 11. In addition, the timing signal generated with the TG 20 is also input to the LSI 14, and the LSI 14 controls the image processor 141 and so on in accordance with the driving timing of the CCD 11.

1-1-2. Use Region of CCD

A pixel region on the CCD image sensor for generating image data used when the image processor 141 generates image data for recording (hereinafter, referred to as "use region") is different for each aspect mode. In the following, this is described in detail.

Figure 2A:
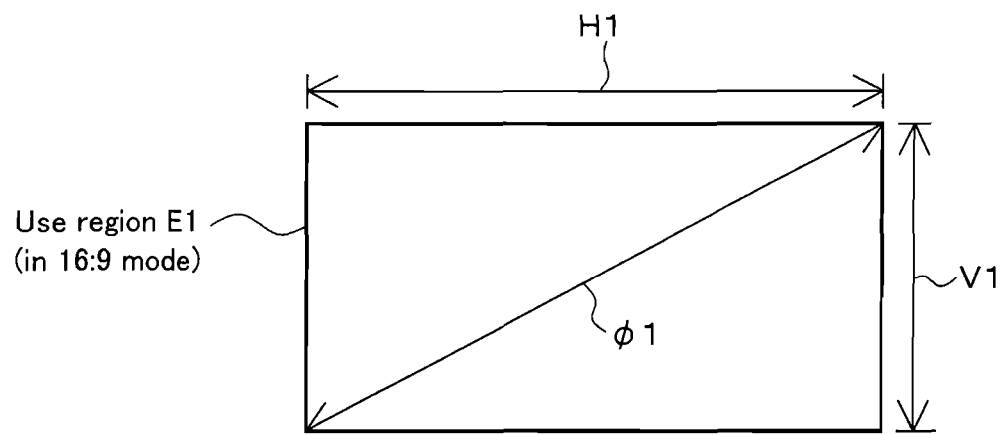
FIGS. 2A to 2D are diagrams showing various use regions and an effective pixel region according to Embodiment 1 of the present invention.
Figure 2B:
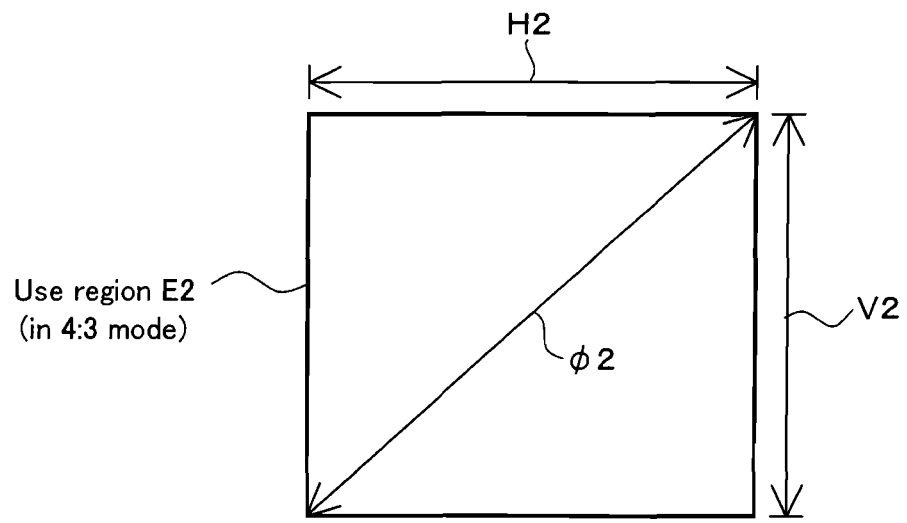
Figure 2C:
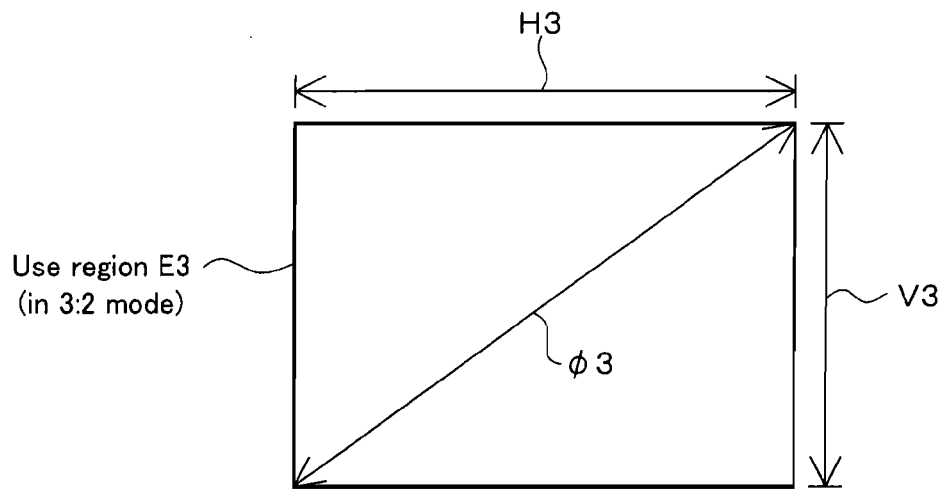
Figure 2D:
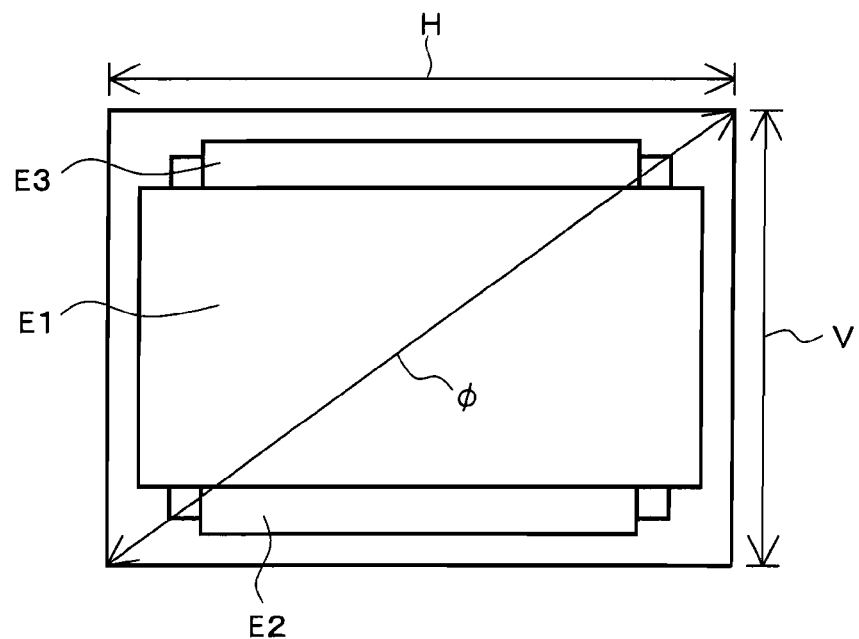

FIGS. 2A to 2D are diagrams showing pixel regions on the CCD 11. FIG. 2A shows the use region in the 16:9 mode (hereinafter, referred to as "use region E1"). FIG. 2B shows the use region in the 4:3 mode (hereinafter, referred to as "use region E2"). FIG. 2C shows the use region in the 3:2 mode (hereinafter, referred to as "use region E3"). FIG. 2D is a diagram showing the relationship among the use regions in the respective modes, and the relationship between the use regions E1 to E3 in the respective modes and the effective pixel region on the CCD 11.

As shown in FIG. 2A, the use region E1 is made up of pixels having dimensions of width H1, height V1 and diagonal length $\phi 1$. H1/V1 is substantially equal to a value 16/9. Further, as shown in FIG. 2B, the use region E2 is made up of pixels having dimensions of width H2, height V2 and diagonal length $\phi 2$, and H2/V2 is substantially equal to a value 4/3. Further, as shown in FIG. 2C, the use region E3 is made up of pixels having dimensions of width H3, height V3 and diagonal length $\phi 3$, and H3/V3 is substantially equal to a value 3/2.

As shown in FIG. 2D, the dimensions of the use regions E1 and E2 have the following relationships:

$$H2 < H1 \quad \text{(Formula 1)}$$

$$V1 < V2 \quad \text{(Formula 2)}$$

That is, between two use regions having aspect ratios that are different from each other, the width of a first use region is set larger than that of a second use region, and the height of the second use regions is set larger than that of the first use region.

These relationships also hold between the use regions E2 and E3, or between the use regions E1 and E3, as shown below.

$$H2 < H3 \quad \text{(Formula 3)}$$

$$V3 < V2 \quad \text{(Formula 4)}$$

$$H3 < H1 \quad \text{(Formula 5)}$$

$$V1 < V3 \quad \text{(Formula 6)}$$

Furthermore, these relationships also hold between three or more regions.

$$H2 < H3 < H1 \quad \text{(Formula 7)}$$

$$V1 < V3 < V2 \quad \text{(Formula 8)}$$

Thus, between two use regions having aspect ratios that are different from each other, the width of a first use region is set larger than that of a second use region, and the height of the second use region is set larger than that of the first use region, so that it is possible to make the numbers of pixels in the use regions in the respective aspect modes close to one another. Accordingly, it is possible to make the sizes or qualities of images for recoding close to one another, even if they have different aspect modes.

H1 to H3 and V1 to V3 above may be determined such that aspect ratios of H1/V1, H2/V2 and H3/V3 are maintained constant at values 16/9, 4/3 and 3/2, respectively, and that the numbers of pixels in the use regions E1 to E3 in the respective modes are set equal. However, it is not necessary to set the numbers of pixels in the use regions precisely equal, and they may be any values that are substantially equal. For example, the numbers of pixels in the use regions (referred as N1-N3) in the respective modes can be regarded as substantially equal when the ratio of any difference among N1-N3 to them (N1-N3) is within 10%.

It is also possible to set the diagonal lengths $\phi 1$ to $\phi 3$ of the use regions equal to one another, instead of directly setting the numbers of pixels in the use regions E1 to E3 equal among the modes. This makes it easy to make the numbers of pixels in the use regions in the aspect modes substantially uniform. Furthermore, since the diagonal angles of view of images having the various aspect ratios are made substantially constant, it is possible to utilize the effective image circle of a lens efficiently even if the aspect mode is switched.

It should be noted that the diagonal lengths $\phi 1$ to $\phi 3$ also do not need to be set precisely equal, and may be values that are substantially equal. For example, the diagonal lengths $\phi 1$ to $\phi 3$ in the respective modes can be regarded as substantially equal when the ratio of any difference among $\phi 1$ to $\phi 3$ to them ($\phi 1$ to $\phi 3$) is within 10%.

It should be noted that the CCD image sensor 11 is one example of a solid-state imaging device according to the present invention. The aspect switching operator 18 is one example of a mode setting portion (mode setting unit) according to the present invention. The image processor 14 is one example of an image processor (image processing unit) according to the present invention. The shutter button 19 is one example of a receiver (release unit) according to the present invention. The liquid crystal monitor 16 is one example of a display portion (display device) according to the present invention. The display controller 145 is one example of a display controller (display device driver) according to the present invention.

1-2. Operation

Figure 3:
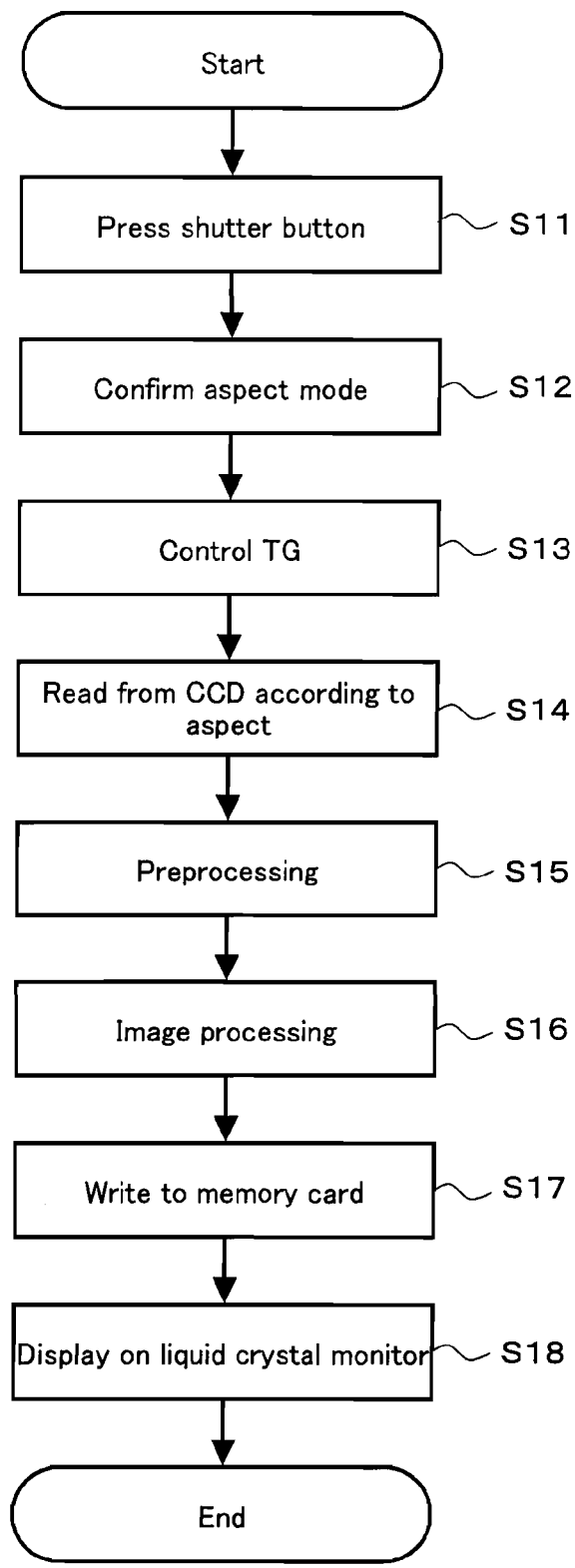
FIG. 3 is a flowchart illustrating the operation of a digital camera according to Embodiment 1 of the present invention.

Next, the operation of the digital camera 100 according to Embodiment 1 is described below with reference to FIG. 3.

Prior to the start of an image-taking operation, a user sets an aspect mode by operating the aspect switching operator 18. Then, when the user half-presses the shutter button 19 and then fully presses it (S11), the image-taking operation is started in the digital camera 100, and an exposure operation is started in the CCD 11.

When the image-taking operation is started, the CPU 142 confirms which of 16:9, 4:3 and 3:2 aspect modes is set (S12). Next, the CPU 142 terminates the exposure operation in the CCD 11. Thereafter, the CPU 142 instructs the TG 20 to generate a timing signal. The timing signal generated from the TG 20 is a signal that enables the image data having a pixel region corresponding to the set aspect to be output from the CCD 11 (S13). That is, the CPU 142 can switch and read the use region of the CCD 11 by adjusting the timing signal from the TG 20. For example, when the aspect mode is 16:9, the TG 20 generates a timing signal that enables the pixels shown in FIG. 2A to be read from the CCD 11 in accordance with an instruction from the CPU 142.

In response to the timing signal from the TG 20, the CCD driving circuit 21 drives the CCD 11 (S14). Thereby, the CCD 11 outputs image data that is generated with the pixels in the use region corresponding to the aspect mode.

The image data read from the CCD 11 is subjected to CDS processing with the AFE 12. The image data subjected to CDS processing is digitized with the ADC 13. The digitized image data is pre-processed with the preprocessor 1411 (S15). The pre-processed image data is stored temporarily in the buffer memory 15, and then subjected, as needed, to YC processing, zoom processing, compression processing and so on, thereby forming image data for recording (S16).

The generated image data for recording is written to the memory card 17 (S17). Then, the display controller 145 displays the image corresponding to the image data for recording on the liquid crystal monitor 16 (S18).

Figure 4A:
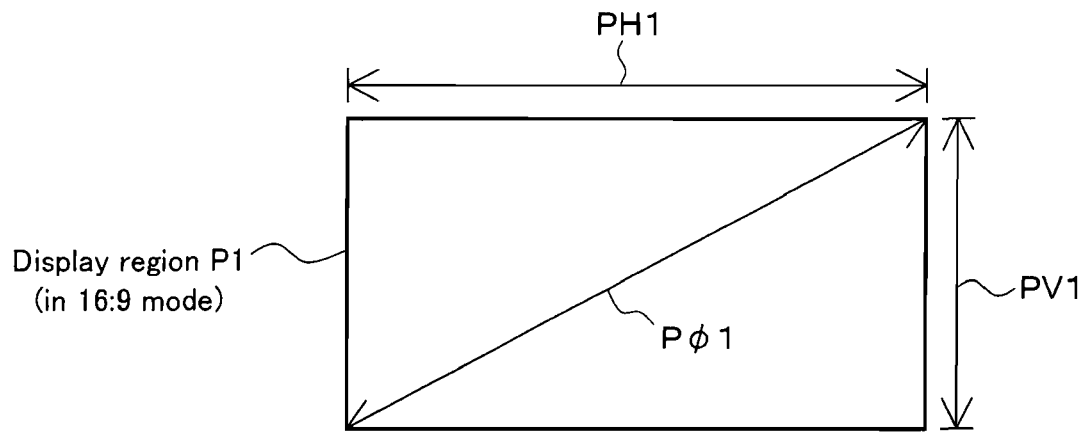
FIGS. 4A to 4D are diagrams showing various display regions and a displayable region of a liquid crystal monitor according to Embodiment 1 of the present invention.
Figure 4B:
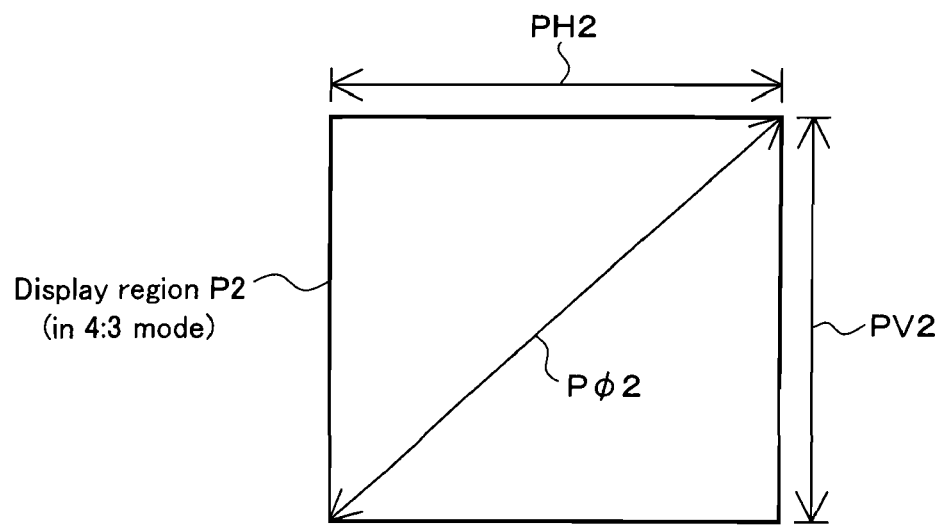
Figure 4C:
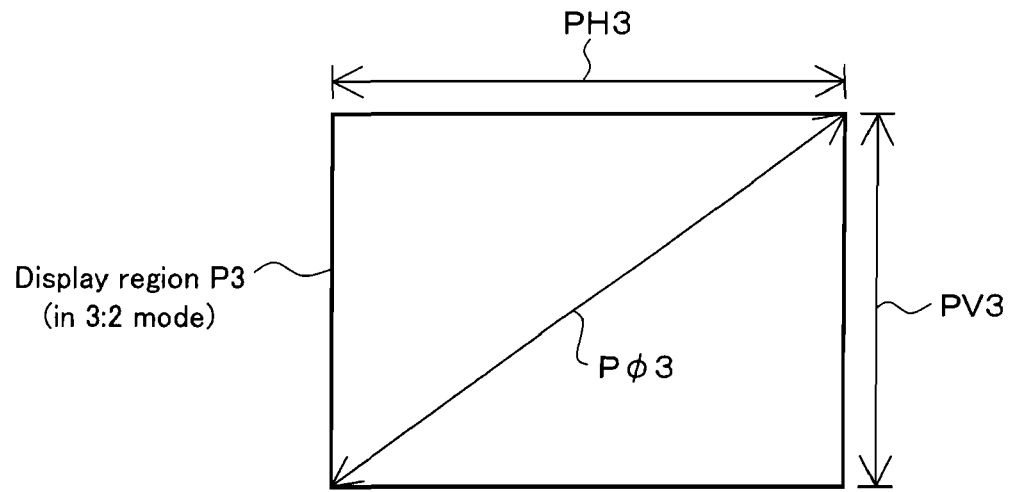
Figure 4D:
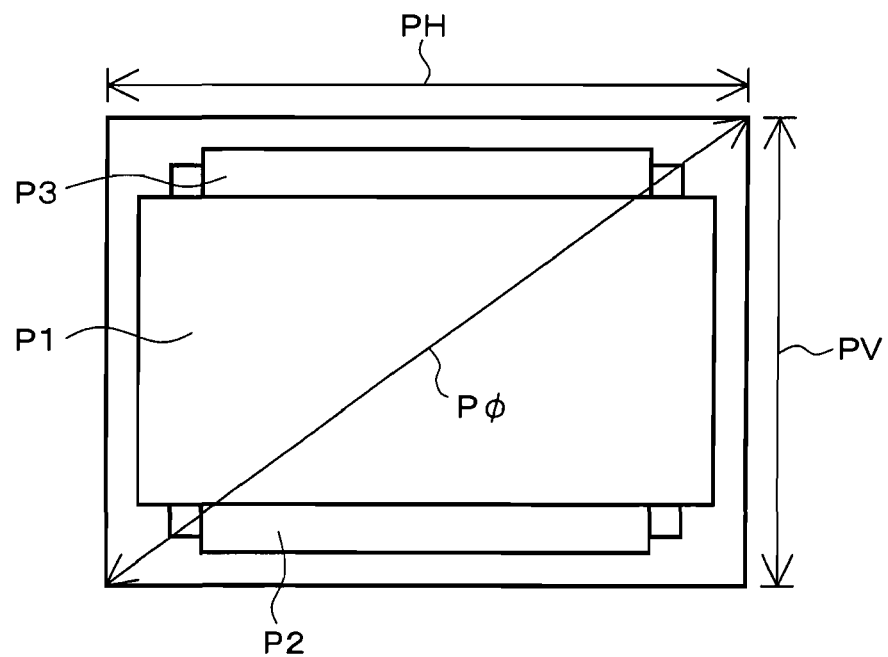

In the following, the operation of displaying an image on the liquid crystal monitor 16 is described with reference to FIGS. 4A to 4D and FIG. 5. FIGS. 4A to 4D are diagrams showing display regions on the liquid crystal monitor 16. FIG. 4A shows the display region in the 16:9 mode (hereinafter, referred to as "display region P1"). FIG. 4B shows the display region in the 4:3 mode (hereinafter, referred to as "display region P2"). FIG. 4C shows the display region in the 3:2 mode (hereinafter, referred to as "display region P3"). FIG. 4D is a diagram showing the relationship among the display regions in the respective modes and the relationship between the display regions P1 to P3 in the respective modes and the display pixel region on the liquid crystal monitor 16.

As shown in FIG. 4A, the display region P1 is made up of pixels having dimensions of width PH1, height PV1 and diagonal length P$\phi$1. PH1/PV1 is substantially equal to a value 16/9. Further, as shown in FIG. 4B, the display region P2 is made up of pixels having dimensions of width PH2, height PV2 and diagonal length P$\phi$2, and PH2/PV2 is substantially equal to a value 4/3. Further, as shown in FIG. 4C, the display region P3 is made up of pixels having dimensions of width PH3, height PV3 and diagonal length P$\phi$3, and PH3/PV3 is substantially equal to a value 3/2.

As shown in FIG. 4D, the dimensions of the display regions P1 and P2 have the following relationships:

$$PH2 < PH1 \quad \text{(Formula 9)}$$

$$PV1 < PV2 \quad \text{(Formula 10)}$$

That is, between two display regions having aspect ratios that are different from each other, the width of a first display region is set larger than that of a second display region, and the height of the second display region is set larger than that of the first display region.

These relationships also hold between the display regions P2 and P3, and between the display regions P1 and P3, as shown below.

$$PH2 < PH3 \quad \text{(Formula 11)}$$

$$PV3 < PV2 \quad \text{(Formula 12)}$$

$$PH3 < PH1 \quad \text{(Formula 13)}$$

$$PV1 < PV3 \quad \text{(Formula 14)}$$

Furthermore, these relationships also hold between three or more display regions.

$$PH2 < PH3 < PH1 \quad \text{(Formula 15)}$$

$$PV1 < PV3 < PV2 \quad \text{(Formula 16)}$$

Thus, between two display regions having aspect ratios that are different from each other, the width of a first display region is set larger than that of a second display region and the height of the second display region is set larger than that of the first display region, so that it is possible to make the numbers of pixels in the display regions in the respective aspect modes close to one another. Accordingly, it is possible to make the qualities of display images approximate to one another, even if they have different aspect modes. Furthermore, since the relationship among the use regions E1 to E3 on the solid-state imaging device shown in FIG. 2D and the relationship among the display regions P1 to P3 shown in FIG. 4D are set similarly, the captured image and the display image correspond well. Accordingly, it is possible to eliminate a sense of incongruity resulting from a difference between the captured image and the display image displayed at the time of photographing when reproducing the captured image.

PH1 to PH3 and PV1 to PV3 above may be determined such that aspect ratios PH1/PV1, PH2/PV2, PH3/PV3 are maintained constant at values 16/9, 4/3 and 3/2, respectively, and that the numbers of pixels in the display regions P1 to P3 in the respective modes are set equal. However, it is not necessary to set the numbers of pixels in the display regions precisely equal, and may be any values that are substantially equal. For example, the numbers of pixels in the use regions (referred as N1-N3) in the respective modes can be regarded as substantially equal when the ratio of any difference among N1-N3 to them (N1-N3) is within 10%.

It is also possible to set the diagonal lengths P$\phi$1 to P$\phi$3 of the use regions equal to one another, instead of directly setting the numbers of pixels in the display regions P1 to P3 equal among the modes. This makes it easy to make the numbers of pixels in the display regions in the aspect modes substantially uniform.

It should be noted that the diagonal lengths P$\phi$1 to P$\phi$3 also do not need to be set precisely equal, and may be any values that are substantially equal. For example, the diagonal lengths $\phi$1 to $\phi$3 in the respective modes can be regarded as substantially equal when the ratio of any difference among $\phi$1 to $\phi$3 to them $\phi$1 to $\phi$3 is within 10%.

Figure 5:
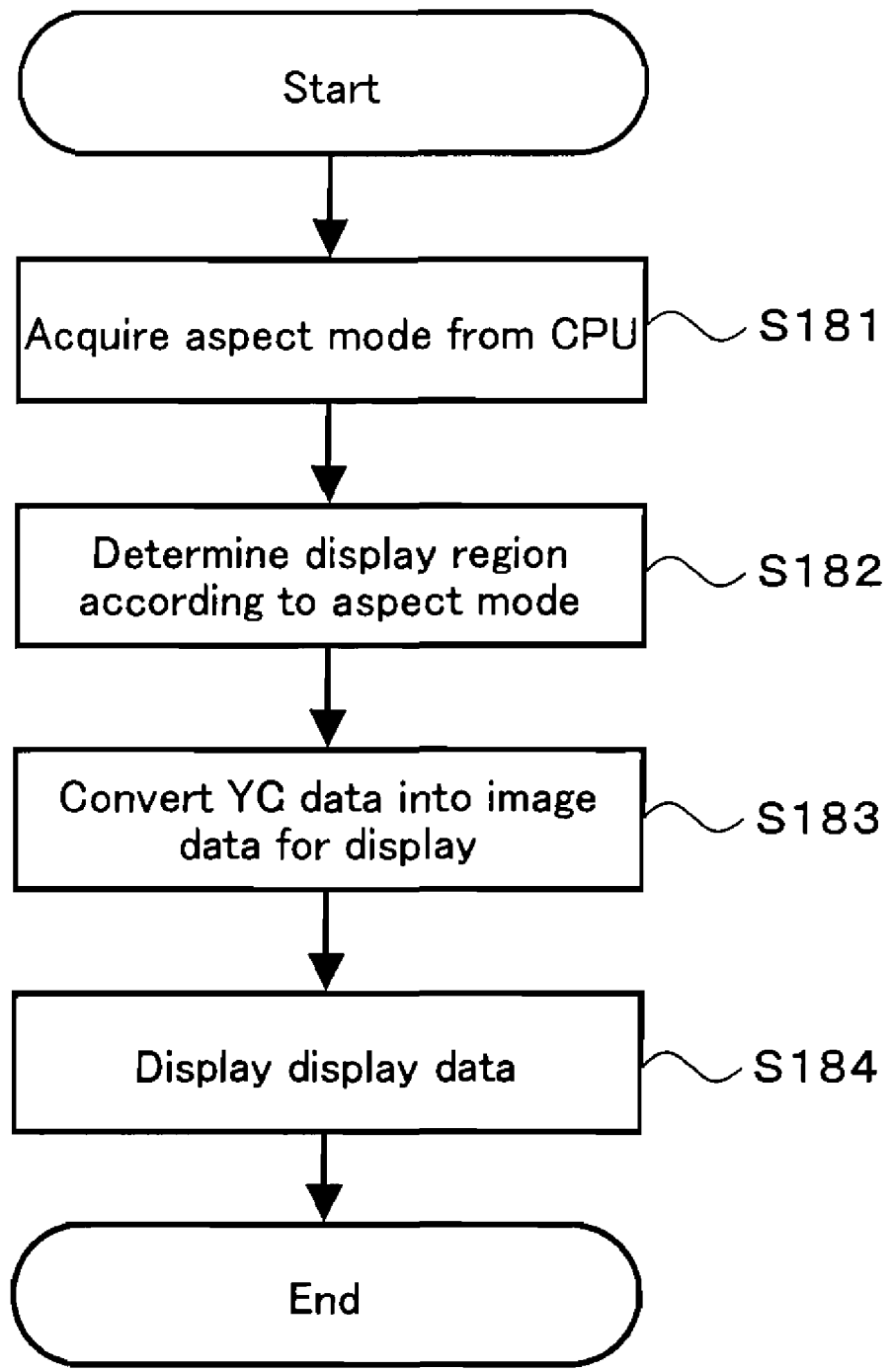
FIG. 5 is a flowchart illustrating an image display operation of the digital camera according to Embodiment 1 of the present invention.

FIG. 5 is a flowchart illustrating the operation of displaying an image on the liquid crystal monitor 16. A display image that corresponds to image data for recording is displayed on the liquid crystal monitor 16 during or after recording of the image data for recording.

First, the display controller 145 acquires the aspect mode set by the aspect switching operator 18 from the CPU 142 (S181). Next, the display controller 145 determines the display region corresponding to the acquired aspect mode (S182). For example, when the aspect mode is 16:9, the display controller 145 determines the display region P1 shown in FIG. 4 as the display region. Next, the display controller 145 acquires the image data processed with the YC processor 1412, and converts that image data into image data for display (S183). At this time, the display controller 145 generates image data for display for displaying all the images resulting from the image data within the display region determined in Step S182. That is, the display controller 145 adapts the image data to fit into the display region determined in Step S182, and associates the other regions with no signal. The display controller 145 outputs the thus generated image data for display to the liquid crystal monitor 16 for display (S184).

1-3. Conclusion of Embodiment 1 of the Present Invention

As described above, the digital camera 100 according to Embodiment 1 of the present invention includes a CCD image sensor 11, an aspect switching operator 18 and an image processor 141. The CCD image sensor 11 is a solid-state imaging device in which a plurality of pixels, the number of effective horizontal pixels is H and the number of effective vertical pixels is V, are arranged in a two-dimensional array.

The aspect switching operator 18 is a mode setting portion that sets one of a plurality of aspect modes including a first aspect mode and a second aspect mode. Here, when the aspect mode 16:9 is taken as the first aspect mode, the second aspect mode in Embodiment 1 is the aspect mode 4:3 or the aspect mode 3:2. The reason is that the relationships represented by Formula 1 and Formula 2 hold between the aspect mode 16:9 and the aspect mode 4:3 with regard to the use region, and the relationships represented by in Formula 5 and Formula 6 hold between the aspect mode 16:9 and the aspect mode 3:2 with regard to the use region.

In the first aspect mode, the image processor 141 generates a first image data for recording using image data that is generated with the pixels being H1 horizontal pixels by V1 vertical pixels included in the pixels on the CCD 11 or image data that is obtained by subjecting this image data to predetermined processing. On the other hand, in the second aspect mode, the image processor 141 generates second image data for recording using image data that is generated with the pixels being H2 horizontal pixels by V2 vertical pixels included in the pixels on the CCD 11, or image data that is obtained by subjecting this image data to predetermined processing.

Thus, it is possible to make the numbers of pixels in the respective use regions in the first aspect mode and the second aspect mode close to each other. Accordingly, it is possible to make the sizes or qualities of images for recording close to each other, even if they have different aspect modes. This is convenient, because the user easily can predict the sizes or qualities of images for recording when taking images having various aspect ratios.

As shown in Embodiment 1, it is also possible to set the diagonal lengths of the use regions substantially equal. This makes it easy to determine the use regions. Furthermore, since the diagonal angles of view of the images having the various aspect ratios are substantially constant, it is also possible to utilize the effective image circle of the lens effectively, even if the aspect mode is switched.

As shown in Embodiment 1, the CCD 11 may output image data that is generated with the pixels being H1 horizontal pixels by V1 vertical pixels in the first aspect mode, and output image data that is generated with the pixels being H2 horizontal pixels by V2 vertical pixels in the second aspect mode. By doing so, the image data having an aspect ratio corresponding to the aspect mode can be obtained upon reading image data from the CCD 11, thus eliminating unnecessary to the image processing. If image data having an aspect ratio not corresponding to the aspect mode were to be obtained upon reading image data from the CCD 11, it would be necessary to read, from the CCD 11, image data including image data that is generated with pixels that are not used for image data for recording, so that there will be unnecessary to the image processing after the reading.

Further, as shown in Embodiment 1, it is also possible to provide a liquid crystal monitor 16 and a display controller 145. The liquid crystal monitor 16 has a displayable region in which the number of effective horizontal pixels is PH and the number of effective vertical pixels is PV, and displays image data that is generated with the CCD 11 or image data that is obtained by subjecting this image data to predetermined processing.

The display controller 145 generates first image data for display in the first aspect mode by processing image data that is generated with the CCD 11 or image data that is obtained by subjecting this image data to predetermined processing such that these data are displayed in a region being PH1 horizontal pixels by PV1 vertical pixels included in displayable region of the liquid crystal monitor 16. On the other hand, the display controller 145 generates second image data for display in the second aspect mode by processing image data that is generated with the CCD 11 or image data that is obtained by subjecting this image data to predetermined processing such that these data are displayed in a region being PH2 horizontal pixels by PV2 vertical pixels included in the displayable region of the liquid crystal monitor 16. Then, the following relationships are satisfied:

$$PH2<PH1 \leq PH, \text{ and}$$

$$PV1<PV2 \leq PV.$$

Thus, between two display regions having aspect ratios that are different from each other, the width of a first display region is set larger than that of a second display region and the height of the second display region is set larger than that of the first display region, so that it is possible to make the numbers of pixels in the display regions in the aspect modes close to one another. Accordingly, it is possible to make the sizes or image qualities of display images approximate to one another, even if they have different aspect modes.

Furthermore, since the relationship among the use regions E1 to E3 of the solid-state imaging device and the relationship among the display regions P1 to P3 are set similarly, the captured image and the display image correspond well. Accordingly, it is possible to eliminate a sense of incongruity resulting from differences between the captured image and the display image displayed at the time of photographing, when reproducing the captured image.

Furthermore, as shown in Embodiment 1, the display controller 145 may acquire the currently set aspect mode from the CPU 142. This eliminates the need to analyze image data for each time to determine its aspect ratio, so that it is possible to generate image data for display quickly. However, the present invention also can be applied to a case where the display controller 145 analyzes image data to determine its aspect ratio. By doing so, an aspect ratio corresponding to the image data can be determined reliably.

Furthermore, as with Embodiment 1, the aspect modes may include three or more modes, or may include two modes.

The aspect modes also may include aspect ratio modes that are other than those described above. For example, it is possible to set a 1:1 aspect mode, which results in a square image, a 3:4 aspect mode, which results in a vertically long image, or a 25:9 aspect mode, which results in a horizontally longer image than an image resulting from the aspect mode 16:9.

In this embodiment, the solid-state imaging device is constituted by a CCD image sensor, but the present invention is not limited to this. The solid-state imaging device also may be constituted by a MOS image sensor such as a CMOS image sensor or an NMOS image sensor, instead of the CCD image sensor. In particular, a MOS image sensor is suitable for Embodiment 1, since only the image data corresponding to the aspect mode is acquired from the solid-state imaging device in this embodiment, instead of acquiring all the image data. The reason is that, due to a difference in the mechanism for reading pixel data, a MOS image sensor can perform pixel selection in reading more easily than a CCD image sensor, thereby reading only the image data of the necessary region easily.

Embodiment 2

2-1. Outline of Embodiment 2

Embodiment 1 of the present invention has a configuration in which only the image data in the necessary region corresponding to the set aspect mode is read. In contrast, Embodiment 2 of the present invention has a configuration in which only the image data of the necessary lines for the set aspect mode is read in the vertical direction of the image, and all the image data is read in the horizontal direction of the image. This eliminates the need to perform a complicated control for the horizontal direction in the reading control in the CCD 11, thus making it possible to facilitate the reading control.

2-2. Operation

The operation of a digital camera 100 according to Embodiment 2 of the present invention is described with reference to FIG. 6 and FIG. 7. It should be noted that the configuration of the digital camera 100 according to Embodiment 2 of the present invention is the same as that of the digital camera 100 according to Embodiment 1 of the present invention, and therefore its description has been omitted.

Figure 6:
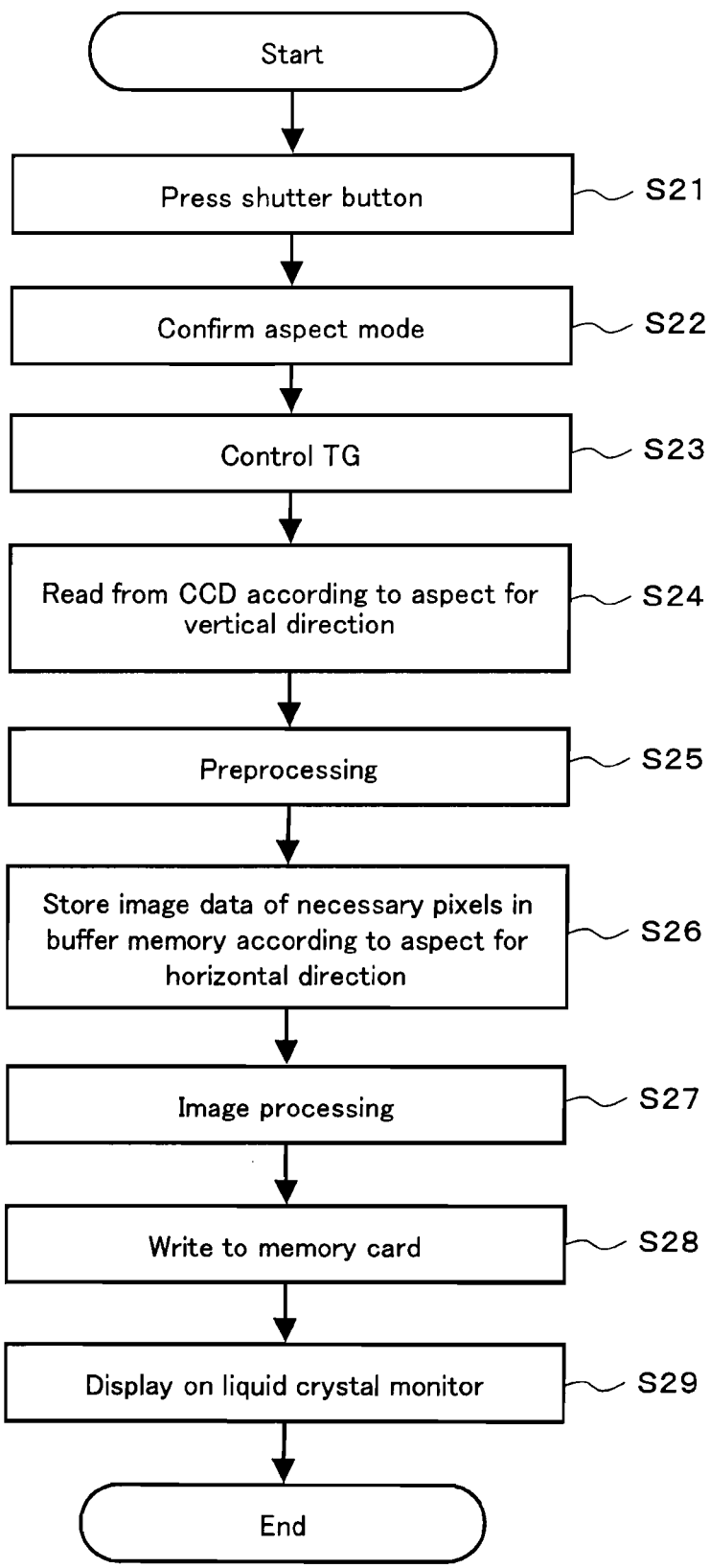
FIG. 6 is a flowchart illustrating the operation of a digital camera according to Embodiment 2 of the present invention.
Figure 7:
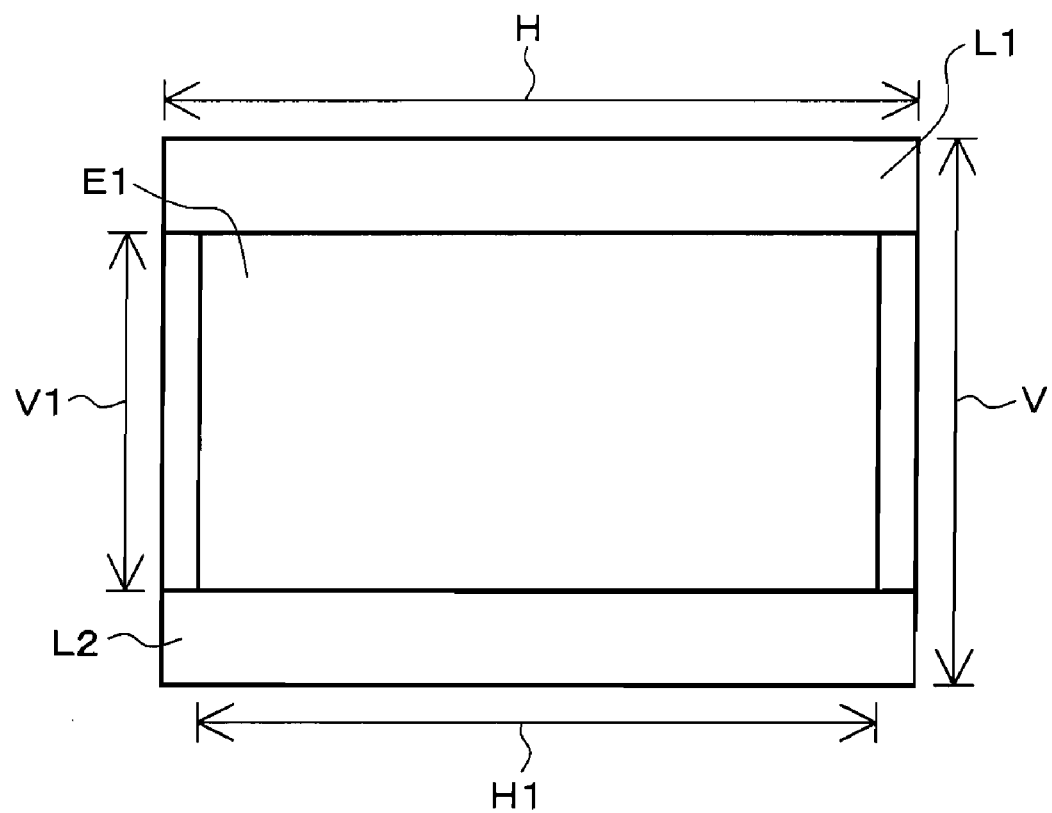
FIG. 7 is a diagram showing read lines of a solid-state imaging device according to Embodiment 2 of the present invention.

FIG. 6 is a flowchart illustrating the operation of the digital camera 100 according to Embodiment 2 of the present invention. The operation in Step S21 and Step S22 is the same as the operation in Step S11 and Step S12 shown in FIG. 3, and therefore their description has been omitted.

When the exposure operation in the CCD 11 is completed, the CPU 142 causes the TG 20 to generate a timing signal. The timing signal generated from the TG 20 is a signal for causing the image data of the lines corresponding to the set aspect to be output from the CCD 11 (S23). That is, the CPU 142 can switch and read the read lines of the CCD 11 by adjusting the timing signal from the TG 20. For example, when the aspect mode is 16:9, the TG 20 generates a timing signal such that the lines constituted by V1 lines at the center shown in FIG. 7 are read.

In response to the timing signal from the TG 20, the CCD driving circuit 21 drives the CCD 11 (S24). Thereby, of the image data generated with the CCD 11, the image data of the lines in region L1 at the upper end is transferred at a high speed, and not read out to the outside of the CCD 11. The image data of the lines constituted by V1 lines at the center is read out to the outside of the CCD 11 at a normal transfer speed. The image data of the lines in region L2 at the lower end is transferred at a high speed, and not read out to the outside of the CCD 11.

The image data read from the CCD 11 is subjected to CDS processing with the AFE 12, and digitized with the ADC 13. The digitized image data is pre-processed with the preprocessor 1411 (S25). The pre-processed image data is stored temporarily in the buffer memory 15 (S26). At this time, of the image data read from the CCD 11, only the image data of H1 pixels at the center is stored in the buffer memory 15. Accordingly, only the image data corresponding to the use region E1 is stored in the buffer memory 15.

Then, the image data is subjected, as needed, to YC processing, zoom processing, compression processing and so on, thereby forming image data for recording (S27). The generated image data for recording is written to the memory card 17 (S28). Then, the image corresponding to the image data for recording is displayed on the liquid crystal monitor 16 (S29).

Embodiment 3

3-1. Relationship Between Use Regions and Effective Pixel Region on CCD

In Embodiment 1 of the present invention, each of the use regions E1 to E3 is set smaller than the effective pixel region, as shown in FIG. 2D. That is, the following relationships hold:

$$H > H1 \quad \text{(Formula 17)}$$

$$V > V2 \quad \text{(Formula 18)}$$

However, the present invention also can be applied to a case where the width and/or height of the effective pixel region is equal to the width and/or height of one of the use regions E1 to E3. Examples for such a case are described below as Embodiment 3.

3-1-1. Example 1 of Embodiment 3

Figure 8:
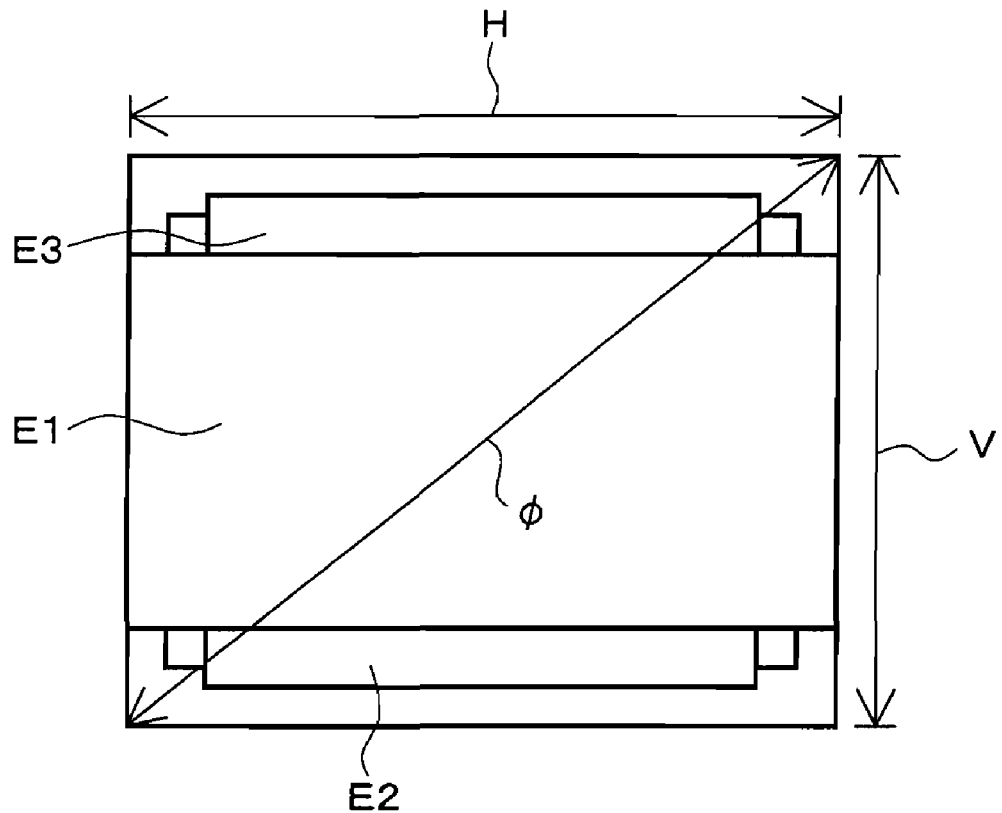
FIG. 8 is a diagram showing various use regions and an effective pixel region according to Example 1 of Embodiment 3 of the present invention.

FIG. 8 is a diagram showing the relationship among the use regions E1 to E3 in the respective modes, and the relationship between the use regions E1 to E3 in the respective modes and the effective pixel region on the CCD 11. In FIG. 8, the width H of the effective pixel region is equal to the width H1 of the use region E1. The rest of the arrangement is the same as the arrangement shown in FIG. 2. Accordingly, the following relationship holds:

$$H2 < H3 < H1 = H \quad \text{(Formula 19)}$$

Thus, the width H of the effective pixel region is equal to the width H1 of the use region E1, which has the largest width among the use regions E1 to E3, thereby making it possible to utilize the pixels in the width direction of the effective pixel region as effectively as possible.

3-1-2. Example 2 of Embodiment 3

Figure 9:
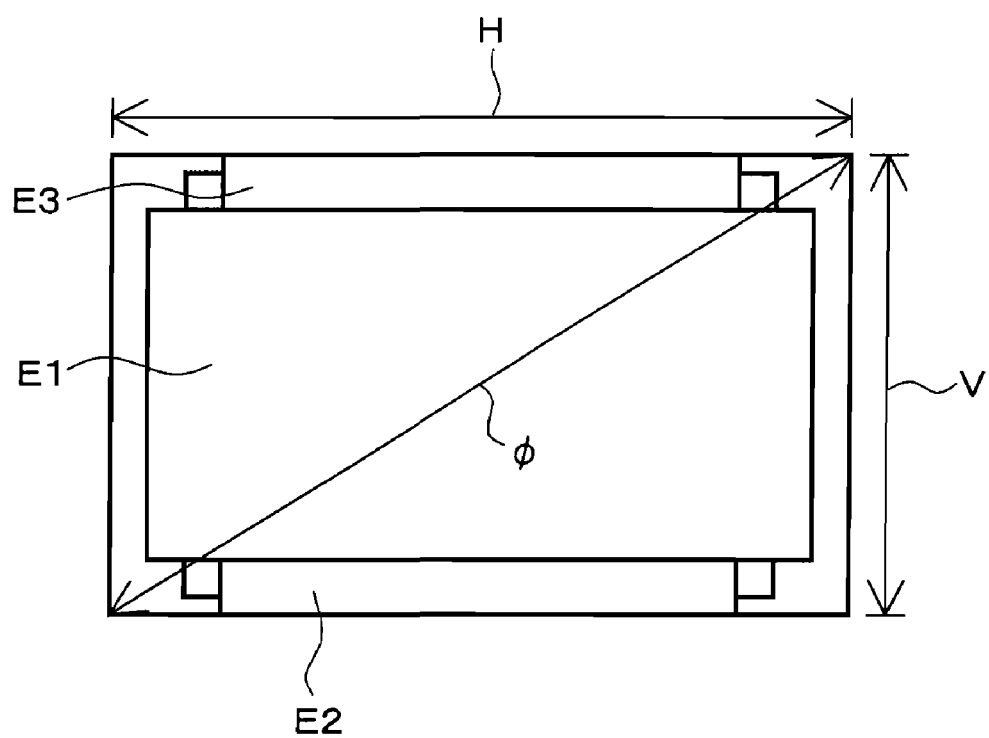
FIG. 9 is a diagram showing various use regions and an effective pixel region according to Example 2 of Embodiment 3 of the present invention.

FIG. 9 is a diagram showing the relationship among the use regions E1 to E3 in the respective modes, and the relationship between the use regions E1 to E3 in the respective modes and the effective pixel region on the CCD 11. In FIG. 9, the height V of the effective pixel region is equal to the height V2 of the use region E2. The rest of the arrangement is the same as the arrangement shown in FIG. 2. Accordingly, the following relationship holds:

$$V1 < V3 < V2 = V \quad \text{(Formula 20)}$$

Thus, the height V of the effective pixel region is equal to the height V2 of the use region E2, which has the largest height among the use regions E1 to E3, thereby making it possible to utilize the pixels in the height direction of the effective pixel region as effectively as possible.

3-1-3. Example 3 of Embodiment 3

Figure 10:
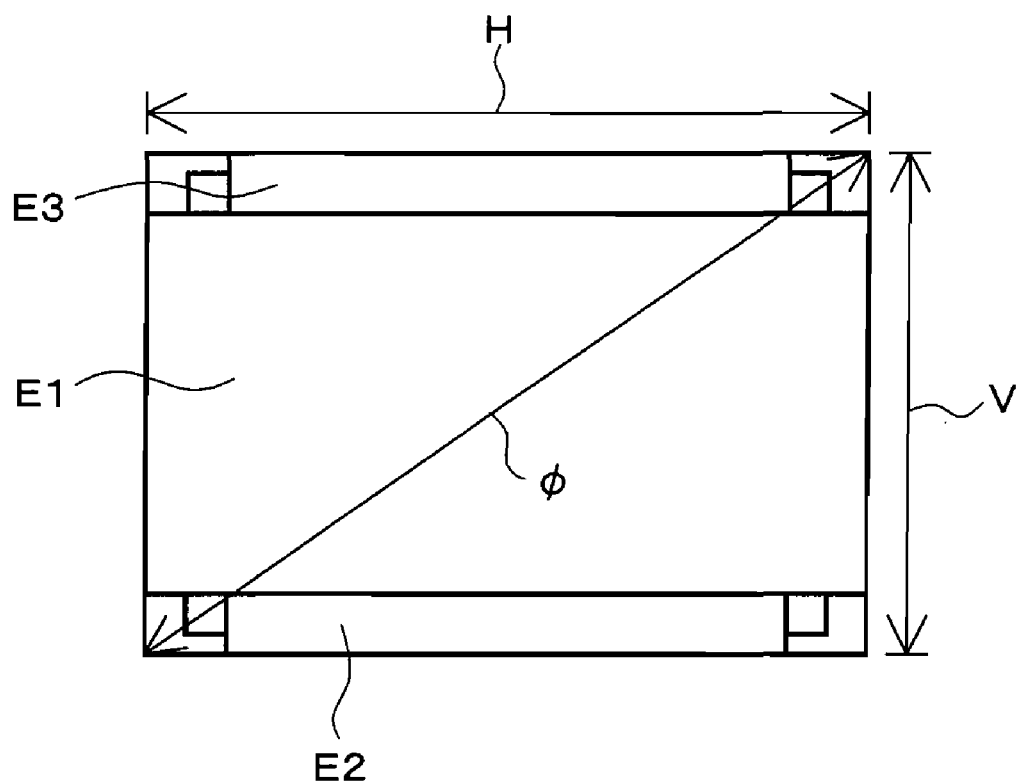
FIG. 10 is a diagram showing various use regions and an effective pixel region according to Example 3 of Embodiment 3 of the present invention.

FIG. 10 is a diagram showing the relationship among the use regions E1 to E3 in the respective modes, and the relationship between the use regions E1 to E3 in the respective modes and the effective pixel region on the CCD 11. In FIG. 10, the width H of the effective pixel region is equal to the width H1 of the use region E1. Furthermore, the height V of the effective pixel region is equal to the height V2 of the use region E2. The rest of the arrangement is the same as the arrangement shown in FIG. 2. Accordingly, both Formula 19 and Formula 20 above are satisfied.

Thus, the width H of the effective pixel region is equal to the width H1 of the use region E1, which has the largest width among the use regions E1 to E3, and the height V of the effective pixel region is equal to the height V2 of the use region E2, which has the largest height among the use regions E1 to E3, thereby making it possible to utilize the pixels in the effective pixel region as effectively as possible.

3-2. Conclusion of Embodiment 3

As described above, according to Embodiment 3, the width and/or height of the effective pixel region may be set equal to the width and/or height of one of the use regions E1 to E3. By doing so, it is possible to utilize the pixels in the effective pixel region as effectively as possible.

Embodiment 4

4-1. Image Data Read Region from CCD 11

In Embodiment 1 of the present invention, the image data generated with the pixels in the use region corresponding to the aspect mode is read from the CCD 11. However, the present invention also can be applied to a case where the image data generated in the entire effective pixel region is read temporarily, regardless of the aspect mode, and then image data for recording is generated according to the aspect mode. Examples for such a case are described below as Embodiment 4 of the present invention.

It should be noted that the configuration of a digital camera according to Embodiment 4 of the present invention is the same as the configuration of the digital camera 100 according to Embodiment 1 of the present invention, and therefore the description thereof has been omitted in the following.

4-1-1. Example 1 of Embodiment 4

Figure 11:
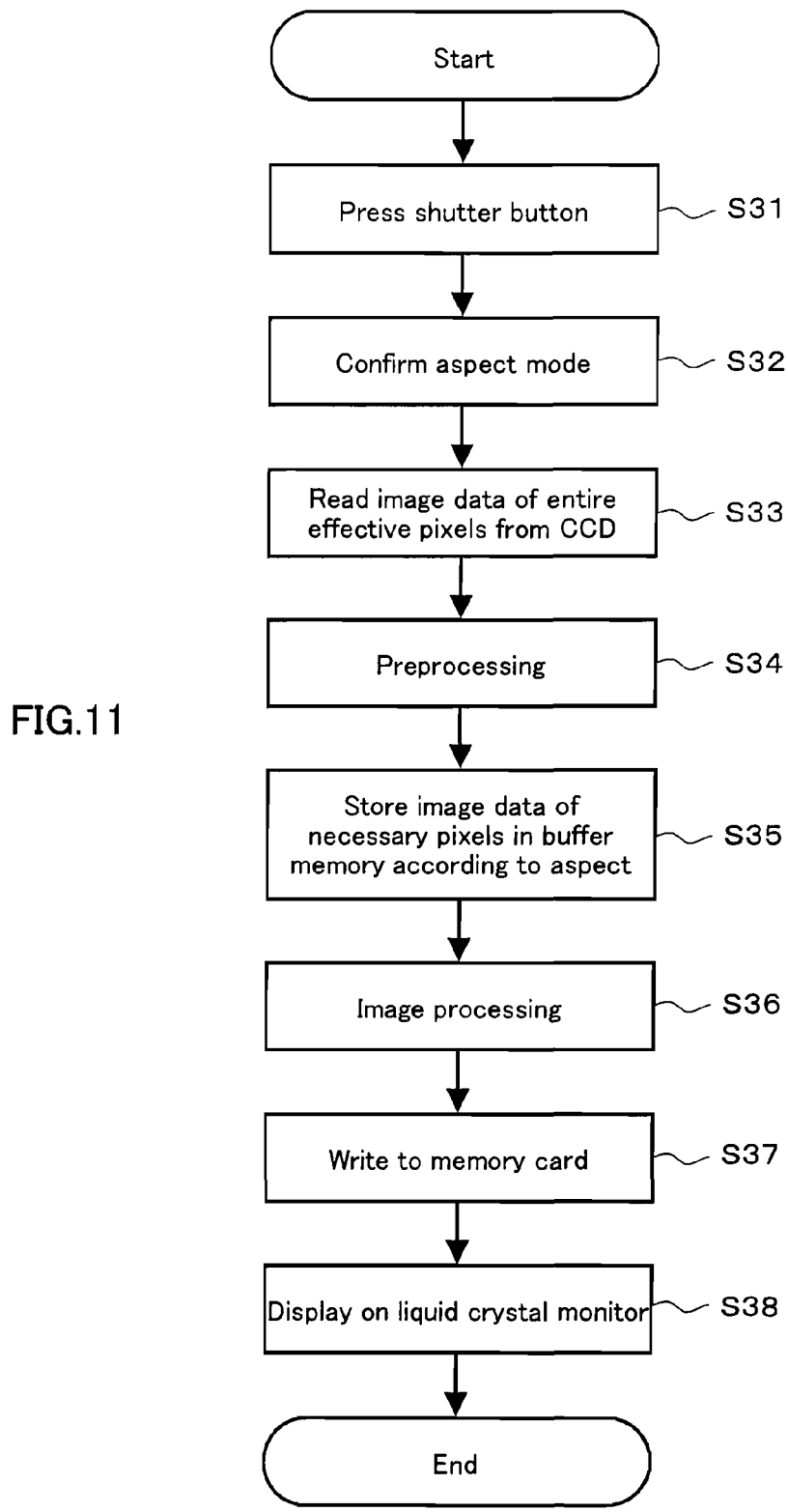
FIG. 11 is a flowchart illustrating the operation of a digital camera according to Example 1 of Embodiment 4 of the present invention.

FIG. 11 is a flowchart illustrating the operation of the digital camera according to Example 1 of this embodiment. The operation of the digital camera according to Example 1 is described with reference to FIG. 11.

Prior to the start of an image-taking operation, the user sets an aspect mode by operating the aspect switching operator 18. Then, when the user half-presses the shutter button 19 and then fully presses it (S31), the image-taking operation is started in the digital camera 100.

When the image-taking operation is started, the CPU 142 confirms which of 16:9, 4:3 and 3:2 aspect modes is set (S32). Next, the CPU 142 terminates the exposure operation in the CCD 11.

Next, in response to the timing signal from the TG 20, the CCD driving circuit 21 drives the CCD 11. The CCD 11 outputs the image data generated with the pixels in the entire effective pixel region, under control of the CCD driving circuit 21 (S33).

The image data read from the CCD 11 is subjected to CDS processing with the AFE 12, and digitized with the ADC 13. The digitized image data is pre-processed with the preprocessor 1411 (S34).

Next, under control by the CPU 142, the memory management portion 144 extracts the image data generated with the pixels in the use region (one of the use regions E1 to E3) corresponding to the aspect mode from the image data of the entire effective pixel region that has been processed with the preprocessor 1411, and causes the buffer memory 15 to store this image data. Accordingly, the buffer memory 15 temporarily stores image data that is generated with the pixels in the use region corresponding to the aspect mode and has been subjected to the predetermined processes with the AFE 12, the ADC 13 and the preprocessor 1411. For example, when the aspect mode is 16:9, the memory management portion 144 extracts the image data generated with the pixels in the use region E1 from the image data of the entire effective pixel region that has been processed with the preprocessor 1411, under control by the CPU 142, and causes the buffer memory 15 to store this image data (S35).

Then, the image data is subjected, as needed, to YC processing, zoom processing, compression processing and so on, thereby forming image data for recording (S36).

The generated image data for recording is written to the memory card 17 (S37). Then, the image corresponding to the image data for recording is displayed on the liquid crystal monitor 16 (S38).

As described above, the image data of the entire effective pixel region is read from the CCD 11 in Example 1 of this embodiment, so that it is not necessary to perform a complex control for the TG 20, making it possible to read the image data from the CCD 11 easily.

Furthermore, Example 1 of this embodiment adopts a configuration in which image data that is generated in the use region corresponding to the aspect mode, or image data that is obtained by subjecting this image data to predetermined processing is stored in the buffer memory 15, so that the storage capacity required for storing image data can be smaller than in a configuration in which all the image data generated in the entire effective pixel region is stored.

4-1-2. Example 2 of Embodiment 4

Figure 12:
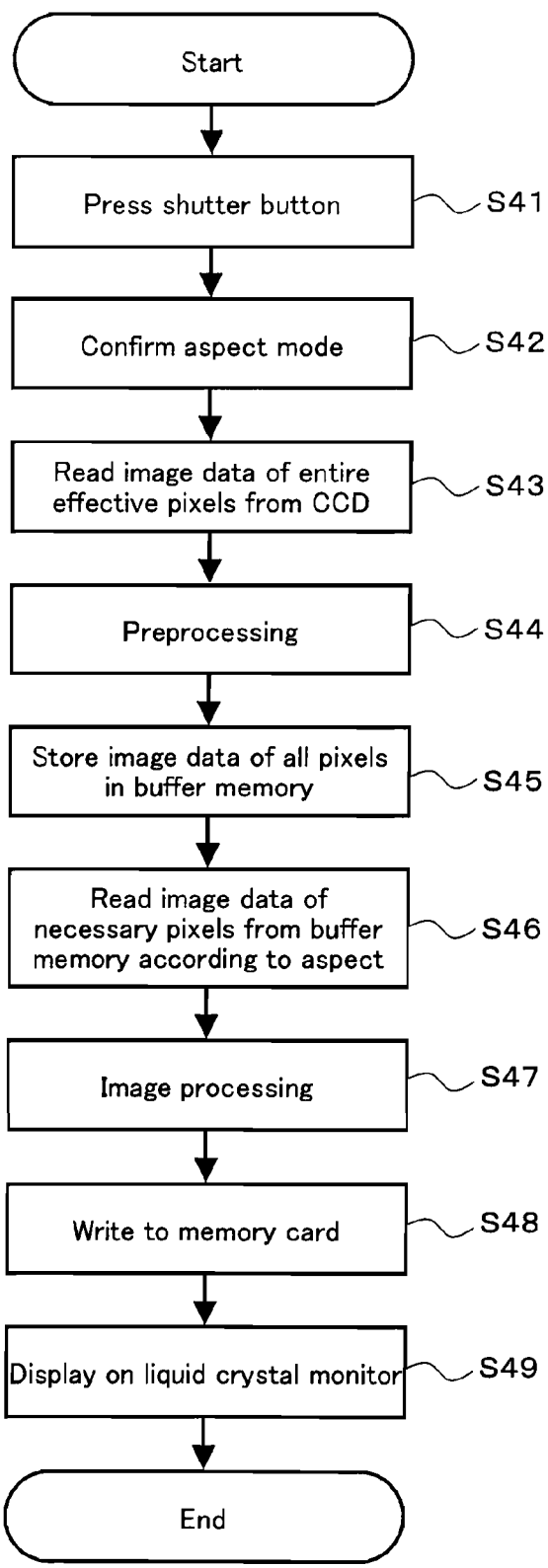
FIG. 12 is a flowchart illustrating the operation of a digital camera according to Example 2 of Embodiment 4 of the present invention.

FIG. 12 is a flowchart illustrating the operation of a digital camera according to Example 2 of this embodiment. The operation of the digital camera according to Example 2 is described below with reference to FIG. 12.

Prior to the start of an image-taking operation, the user sets an aspect mode by operating the aspect switching operator 18. Then, when the user half-presses the shutter button 19 and then fully presses it (S41), the image-taking operation is started in the digital camera 100.

When the image-taking operation is started, the CPU 142 confirms which of the 16:9, 4:3 and 3:2 aspect modes is set (S42). Next, the CPU 142 terminates the exposure operation in the CCD 11.

Next, in response to the timing signal from the TG 20, the CCD driving circuit 21 drives the CCD 11. The CCD 11 outputs the image data generated with the pixels in the entire effective pixel region, under control by the CCD driving circuit 21 (S43).

The image data read from the CCD 11 is subjected to CDS processing with the AFE 12, and digitized with the ADC 13. The digitized image data is pre-processed with the preprocessor 1411 (S44).

Next, the memory management portion 144 causes the buffer memory 15 to store the image data processed with the preprocessor 1411 (S45). Accordingly, the buffer memory 15 temporarily stores all the image data that is generated with the pixels in the effective pixel region and that has been subjected to the predetermined processes with the AFE 12, the ADC 13 and the preprocessor 1411.

Next, under the control of the CPU 142, the memory management portion 144 extracts the image data generated with the pixels in the use region (one of the use regions E1 to E3) corresponding to the aspect mode from all the image data of the effective pixel region that is stored in the buffer memory 15, and outputs this to the image processor 141 (S46). For example, when the aspect mode is 16:9, the memory management portion 144 extracts image data that is generated with the pixels in the use region E1 and has been subjected to the predetermined processing, under the control of the CPU 142, and outputs it to the image processor 141.

Then, the image data is subjected, as needed, to YC processing, zoom processing, compression processing and so on, thereby forming image data for recording (S47).

The generated image data for recording is written to the memory card 17 (S48). Then, the image corresponding to the image data for recording is displayed on the liquid crystal monitor 16 (S49).

It should be noted that the above-described extraction processing of the necessary image data corresponding to the aspect mode may be performed in any stage of the image processing procedure. For example, it may be performed before the YC processing. The YC processing may be performed for all the effective pixels, and the extraction processing may be performed with the zoom processing.

The YC processing and the zoom processing may be performed for all the effective pixels, and the extraction processing may be performed before the compression processing.

The extraction processing also may be performed during the writing to the memory card 17 after performing all the image processes for all the effective pixels.

As described above, all the image data of the entire effective pixel region temporarily is stored in the buffer memory 15 in Example 2 of this embodiment, so that the subsequent processing on the image data can be performed freely. For example, it is possible to change the aspect mode after storing the image data in the buffer memory 15. The reason is that all the necessary image data are stored in the buffer memory 15.

4-2. Conclusion of Embodiment 4

The digital camera according to Embodiment 4 of the present invention further includes a buffer memory 15, in addition to a CCD 11, an aspect switching operator 18 and an image processor 141.

The buffer memory 15 temporarily stores image data that is generated with a plurality of pixels of which the number of effective horizontal pixels is H and the number of effective horizontal pixels is V on the CCD 11 or image data that is obtained by subjecting this image data to predetermined processing. Then, the image processor 14 generates first image data for recording in the first aspect mode by reading the image data corresponding to the pixels being H1 horizontal pixels by V1 vertical pixels from the image data stored in the buffer memory 15. On the other hand, the image processor 14 generates second image data for recording in second aspect mode by reading the image data corresponding to the pixels being H2 horizontal pixels by V2 vertical pixels from the image data stored in the buffer memory 15.

Thus, the image data of the entire effective pixel region is read from the CCD 11 in the configuration according to Embodiment 4, so that it is not necessary to perform a complex control for the TG 20, making it possible to read the image data from the CCD 11 easily.

Embodiment 5

5-1. Configuration

A digital camera 400 according to Embodiment 5 of the present invention can perform bracketing shooting in terms of aspect ratios. Embodiment 5 is described below with reference to FIG. 13 and FIG. 14.

Figure 13:
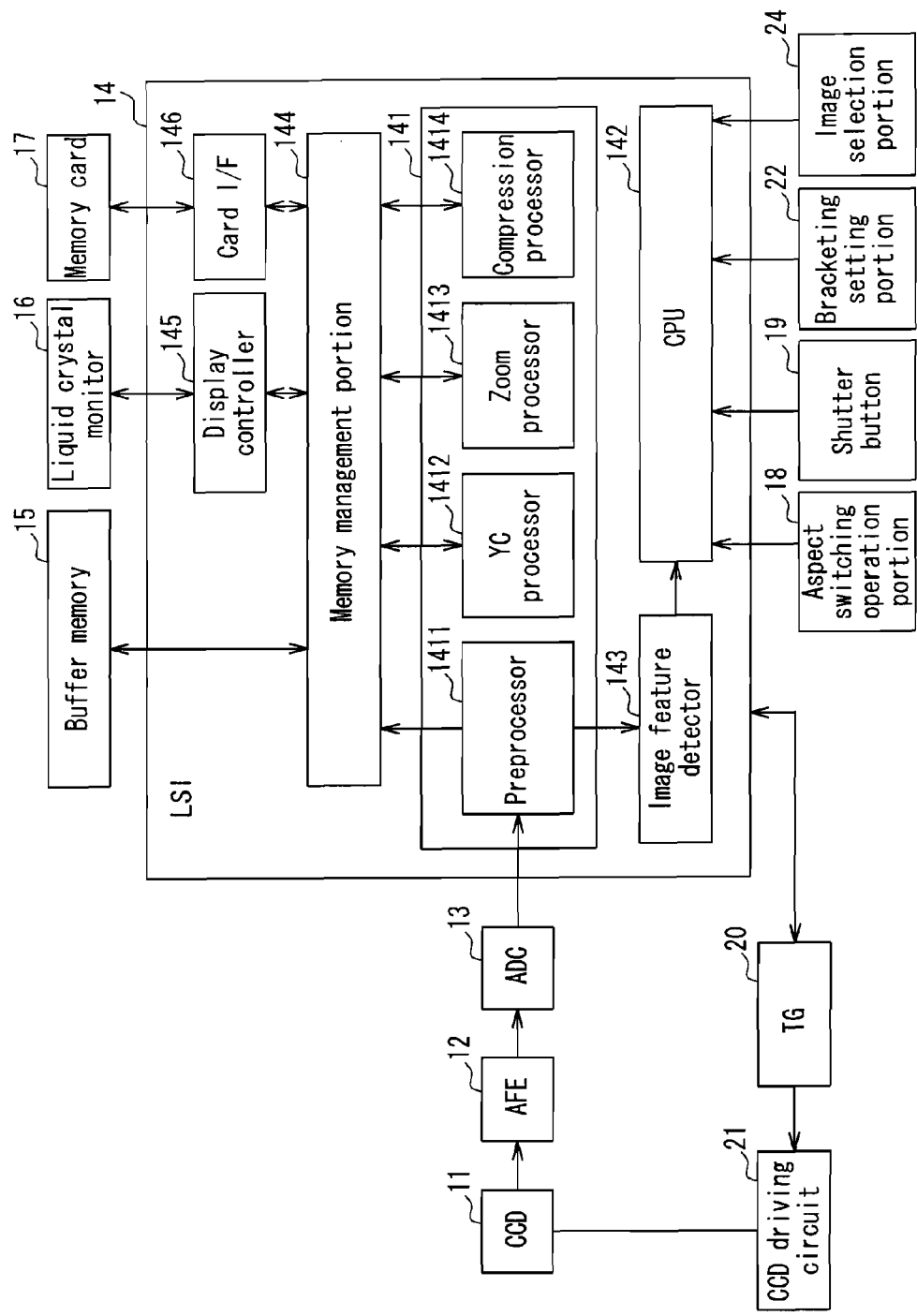
FIG. 13 is a block diagram showing the configuration of an image pickup apparatus according to Embodiment 5 of the present invention.

FIG. 13 is a block diagram showing a configuration of the digital camera 400 according to Embodiment 5. A bracketing setting portion 22 is a means for setting an aspect bracketing mode. An image selector 24 is a means for selecting one of a plurality of images generated in the aspect bracketing mode and having different aspect ratios. The rest of the configuration is the same as the configuration of the digital camera 100 according to the Embodiment 1 of the present invention, and therefore the description thereof has been omitted.

5-2. Operation

Figure 14:
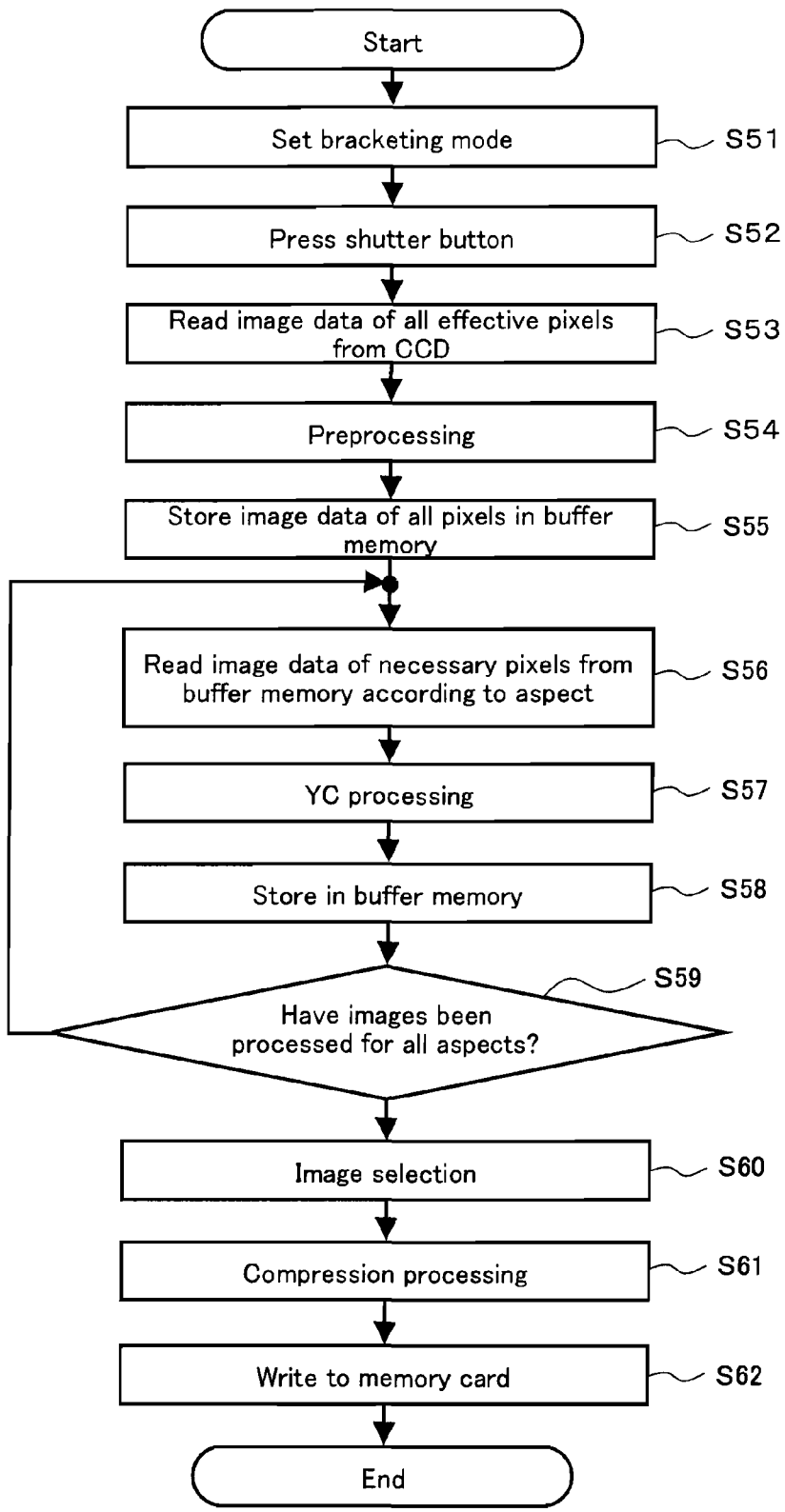
FIG. 14 is a flowchart illustrating the operation of a digital camera according to Embodiment 5 of the present invention.

The operation of the digital camera 400 according to Embodiment 5 is described below with reference to FIG. 14.

First, the user sets the aspect bracketing mode by operating the bracketing setting portion 22 in advance (S51). Then, when the user half-presses the shutter button 19 and then fully presses it (S52), the image-taking operation in the aspect bracketing mode is started in the digital camera 400.

When the image-taking operation is started, the CPU 142 starts the exposure operation in the CCD 11. Then, in response to the timing signal from the TG 20, the CCD driving circuit 21 drives the CCD 11. The CCD 11 outputs image data that is generated with the pixels in the entire effective pixel region (S53).

The image data read from the CCD 11 is subjected to CDS processing with the AFE 12, and digitized with the ADC 13. The digitized image data is pre-processed with the preprocessor 1411 (S54).

Next, the memory management portion 144 causes the buffer memory 15 to store the image data processed with the preprocessor 1411 (S55). Accordingly, the buffer memory 15 temporarily stores all the image data that is generated with the pixels in the effective pixel region and has been subjected to the predetermined processes with the AFE 12, the ADC 13 and the preprocessor 1411.

Next, images having aspect ratios that are different from each other are generated successively. First, under the control of the CPU 142, the memory management portion 144 extracts the image data generated with the pixels in the use region E1 according to the initial aspect mode from all the image data of the effective pixel region that is stored in the buffer memory 15, and outputs this to the image processor 141 (S56).

Then, the YC processor 1412 performs YC processing on the image data corresponding to the use region E1 that has been read from the buffer memory 15 (S57).

The generated YC data is stored in the buffer memory 15 (S58).

The above-described operation from the Steps S56 to S58 similarly is repeated for the image data corresponding respectively to the use regions E2 and E3 having the remaining aspect ratios (S59).

When the above-described operation is completed from all the aspect ratios, the CPU 142 controls the liquid crystal monitor 16 to display the YC images having the respective aspect ratios. Then, the image selector 24 receives a user instruction regarding image selection, and selects one of the plurality of image data having different aspect ratios that are stored in the buffer memory 15 (S60).

Next, the compression processor 1414 generates image data for recording by performing compression processing on the image data selected by the image selector 24 (S61). At this time, zoom processing may be performed by the zoom processor 1413. Alternatively, zoom processing may be performed before selecting the image.

Then, the generated image data for recording is written to the memory card 17 (S62).

It should be noted that the above-described extraction processing of the necessary image data corresponding to the aspect mode may be performed at any stage of the image processing procedure. For example, it may be performed before the YC processing. The YC processing may be performed for all the effective pixels, and the extraction processing may be performed in the zoom processing.

The YC processing and the zoom processing may be performed for all the effective pixels, and the extraction processing may be performed before the compression processing.

The extraction processing also may be performed in the writing to the memory card 17 after performing all the image processes for all the effective pixels.

5-3. Conclusion of Embodiment 5

As described above, the digital camera 400 according to Embodiment 5 of the present invention includes a CCD 11, an image processor 141, a bracketing setting portion 22 and a shutter button 19. The bracketing setting portion 22 can set the aspect bracketing mode. When the shutter button 19 receives an instruction to start image taking in a case where the aspect bracketing mode is set by the bracketing setting portion 22, the image processor 141 generates a plurality of image data for recording having aspect ratios that are different from one another.

Thus, it is possible to generate a plurality of image data for recording having different aspect ratios for the same photographic subject, thus making is possible to select the image having the aspect ratio suitable for the photographic subject after taking images. Accordingly, it is possible to perform image-taking with few failures.

In addition, it is preferable that the present invention further includes the buffer memory 15 that temporarily stores image data that is generated with a plurality of pixels on the CCD 11 or image data that is obtained by subjecting this image data to predetermined processing, as shown in Embodiment 5. In this case, when the shutter button 19 receives an instruction to start image-taking in a case where the aspect bracketing mode is set, the image processor 141 may read each of the image data corresponding to pixel arrays having a plurality of aspect ratios from the image data stored in the buffer memory 15, and generate a plurality of image data for recording having aspect ratios that are different from one another.

Embodiment 6

Next, Embodiment 6 of the present invention is described. Embodiment 6 is a modification of Embodiments 1 to 5.

The solid-state imaging device is constituted by a CCD image sensor 11 in Embodiments 1 to 5 of the present invention, but the present invention is not limited to this. The solid-state imaging device may be any image sensor in which a plurality of pixels is arranged in a two-dimensional array. For example, it may be a CMOS image sensor or the like.

The CCD 11 and the CCD driving circuit 21 are described as different structural components in Embodiments 1 to 5 of the present invention, but they may be constructed as a single semiconductor device.

The TG 20 and the CCD driving circuit 21 also may be constructed as a single component.

Embodiments 1 to 5 of the present invention adopt a configuration in which CDS processing (noise canceling processing) and ADC conversion processing are performed before image processing, but the present invention is not limited to this. For example, image data that is read from the CCD 11 may be processed by the preprocessor 1411 directly, or may be stored in the buffer memory 15. In addition, another processing may be performed before image processing.

Examples in which the image processor 141, the CPU 142 and so on are implemented on the same LSI 14 are described in Embodiments 1 to 5 of the present invention, but the present invention is not limited to this. These various parts may be formed separately, or may be formed in a plurality of groups. For example, it is possible to form the image processor 141 of a single DSP (Digital Signal Processor), and form the CPU 142 and the other parts of a single microcomputer.

Examples in which the image processor performs YC processing, resolution conversion processing, compression processing and so on are described in Embodiments 1 to 5 of the present invention, but the present invention is not limited to this. It is sufficient that the image processor generates image data for recording using image data that is generated with the pixels on the CCD 11, and the image processor according to the present invention may include an image processor that does not perform YC processing, resolution conversion processing, compression processing and so on. The image processor according to the present invention also may include an image processor that performs compression processing other than JPEG. In other words, YC processing, resolution conversion processing, compression processing and so on are examples of image processing. Accordingly, the present invention is applicable to a case where the image data for recording is image data in non-compression format, dynamic images or the like. Furthermore, in some cases, CDS processing (noise canceling processing), ADC conversion or the like before pre-processing can be considered as a part of image processing.

The image processor 14 may be constituted by hardware only, or a combination of hardware and software.

Embodiments 1 to 5 of the present invention adopt a configuration in which the output and input to the buffer memory 15 and so on are managed by the memory management portion 144, but the present invention is not limited to this. For example, this management may be performed by the CPU 142.

Embodiments 1 to 5 of the present invention include a single buffer memory 15, but it is possible to adopt a configuration in which a plurality of buffer memories 15 are provided.

The liquid crystal monitor 16 is shown as an example of the display portion in Embodiments 1 to 5 of the present invention, but the present invention is not limited to this. The display portion may be an organic EL (electro-luminescence) display or an inorganic EL display, for example.

A configuration in which the image data for recording is stored in the memory card 17 is described as an example in Embodiments 1 to 5 of the present invention, but the present invention is not limited to this. For example, the image data for recording may be stored in an built-in memory contained in the image pickup apparatus. In this case, the built-in memory and the buffer memory 15 may be provided separately. It is also possible to use the buffer memory 15 both for temporary storage and for storage of image data for recording.

The aspect switching operator 18 is shown as an example of the mode setting portion in Embodiments 1 to 5 of the present invention, but the present invention is not limited to this. The mode setting portion also may switch the aspect ratio based on some signal, not in accordance with an instruction from the user. For example, it is also possible to adopt a configuration in which the aspect ratio is switched according to a result of photometry.

The shutter button 19 is shown as an example of the receiver in Embodiments 1 to 5 of the present invention, but the present invention is not limited to this. For example, it is possible to adopt a configuration in which an instruction to start image-taking is given by remote control.

The bracketing setting portion 22 is shown as an example of the bracket setting portion in Embodiment 5 of the present invention, the present invention is not limited this. The bracket setting portion may set the aspect bracketing mode based on some signal, not in accordance with an instruction from a user. For example, it is possible to adopt a configuration in which the aspect bracketing mode is set according to a result of photometry.

A configuration is adopted in Embodiment 5 of the present invention in which the image data corresponding to the entire effective pixel region is stored in the buffer memory 15 after subjecting this image data to YC processing, then the image data necessary for obtaining the image data having a desired aspect ratio is extracted from the buffer memory 15, and subjected to zoom processing, compression processing and so on. However, the present invention is not limited to this, and it is also possible to adopt a configuration in which the image data corresponding to the entire effective pixel region is stored in the buffer memory 15 before subjecting this image data to YC processing. Thereafter, the image data necessary for obtaining the image data having a desired aspect ratio may be extracted from the buffer memory 15, and subjected to YC processing, or the above-described image data is used for image selection and so on.

Furthermore, it is also possible to adopt a configuration in which the image data corresponding to the entire effective pixel region is stored in the buffer memory 15 after subjecting this image data to compression processing. In this case, it is possible to adopt a configuration in which all the image data is read from the buffer memory 15, the read image data is decompressed, and then the image data necessary for obtaining the image data having a desired aspect ratio is extracted.

Figure 15:
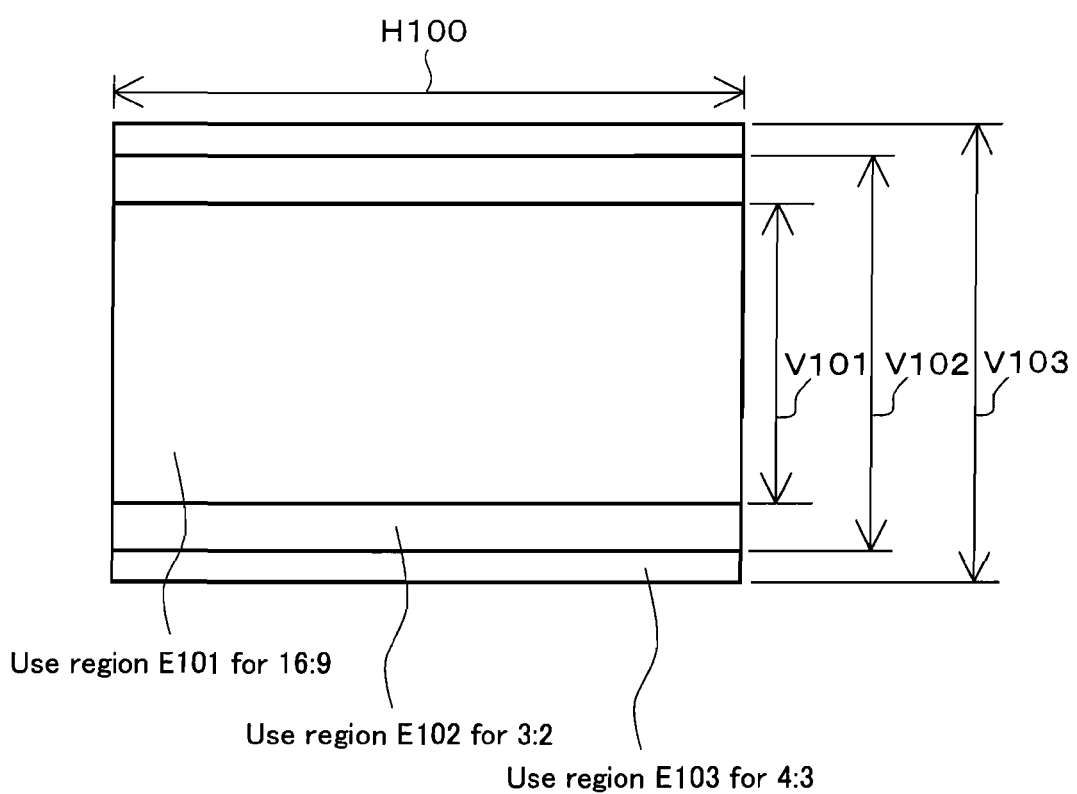
FIG. 15 is a diagram showing various use regions and an effective pixel region according to Related Art 1.
Figure 16:
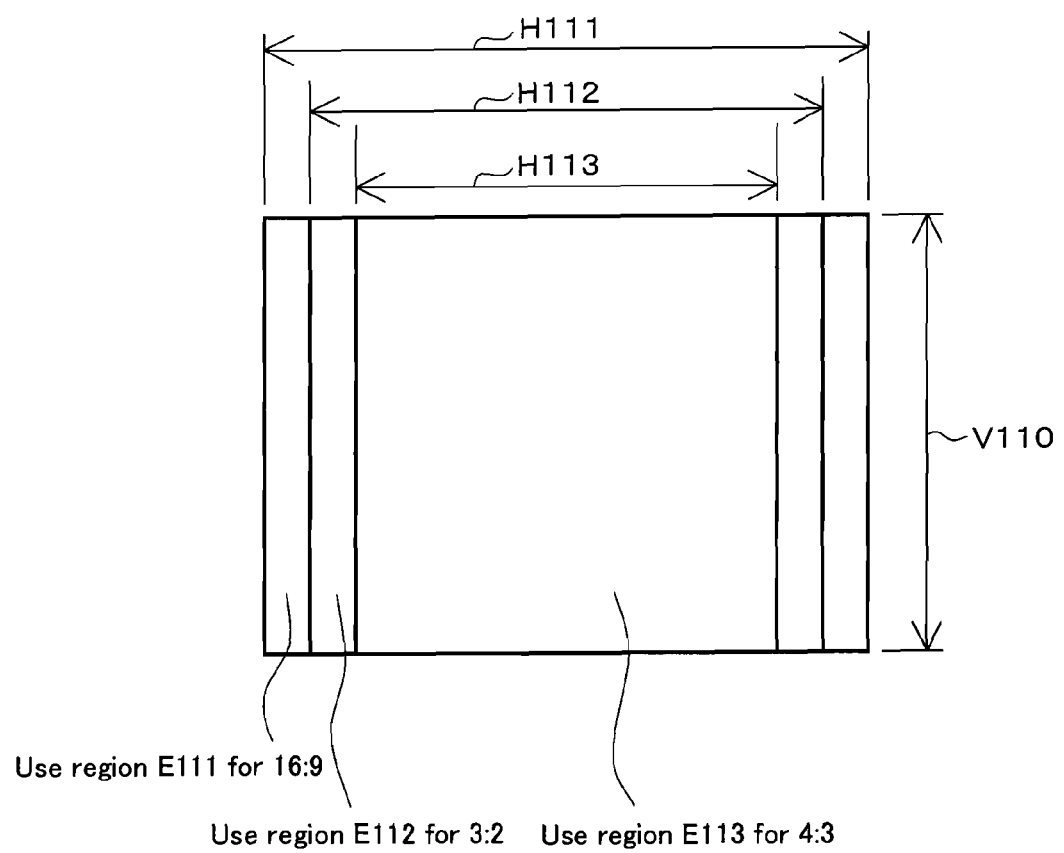
FIG. 16 is a diagram showing various use regions and an effective pixel region according to Related Art 2.

The relationship among the use regions on the CCD 11 at various aspect ratios in Embodiment 6 of the present invention may be that shown in FIG. 2, which satisfies Formula 1 and Formula 2, or may be that shown in FIG. 15 or FIG. 16, which does not satisfy such a relationship. In other words, the invention regarding the aspect bracketing mode according to the present invention is applicable to any use region. However, a relationship among the use regions that satisfies Formula 1 and Formula 2 is more preferable, since it makes it possible to achieve substantially uniform image qualities for various images obtained when performing bracketing shooting.

The first image pickup apparatus according to the present invention is applicable to an image pickup apparatus including a plurality of aspect modes, since it can make the sizes or qualities of images for recording close to each other with a simple configuration even if they have different aspect modes. For example, the image pickup apparatus is applicable to digital still cameras, digital cameras capable of shooting video images, mobile telephone terminals provided with camera functionality, and the like.

Furthermore, the second image pickup apparatus according to the present invention allows for bracketing shooting in terms of aspect ratios, thus making it possible to select the image having an aspect ratio suitable for the photographic subject after taking images. Therefore, it is applicable to digital cameras, mobile telephone terminals provided with camera functionality, and the like.

What is claimed is:

1. A display apparatus comprising:
a display portion that includes a displayable region in which the number of effective horizontal pixels is PH and the number of effective vertical pixels is PV and that is capable of displaying an image resulting from image data or an image resulting from image data obtained by subjecting said image data to predetermined processing; and
a display controller that generates first image data for display when displaying an image having a first aspect ratio on the display portion, and that generates second image data for display when displaying an image having a second aspect ratio on the display portion;
the display controller generates the first image data for display by processing said image data so that the image resulting from the image data or the image resulting from the image data obtained by subjecting said image data to predetermined processing is displayable on a region being PH1 horizontal pixels by PV1 vertical pixels included in the displayable region of the display portion;
the display controller generates the second image data for display by processing said image data so that the image resulting from the image data or the image resulting from the image data obtained by subjecting said image data to predetermined processing is displayable on a region being PH2 horizontal pixels by PV2 vertical pixels included in the displayable region of the display portion; and
the displayable region, the first image data for display, and the second image data for display satisfy the following relationships:

$PH2 < PH1 < PH$, and $PV1 < PV2 < PV$.

2. The display apparatus according to claim 1, wherein a diagonal length $P\phi1$ of the region being PH1 horizontal pixels by PV1 vertical pixels and a diagonal length $P\phi2$ of the region being PH2 horizontal pixels by PV2 vertical pixels satisfy the following relationship:

$P\phi1 \approx P\phi2$.

3. The display apparatus according to claim 2, wherein the first image data for display and the second image data for display satisfy the following relationships:

$PH1/PV1 \approx 16/9$, and $PH2/PV2 \approx 4/3$.

4. The display apparatus according to claim 1, wherein the first image data for display and the second image data for display satisfy the following relationships:

$PH1/PV1 \approx 16/9$, and $PH2/PV2 \approx 4/3$.

* * * * *

UNITED STATES PATENT AND TRADEMARK OFFICE
CERTIFICATE OF CORRECTION

PATENT NO. : 8,005,320 B2  
APPLICATION NO. : 12/633373  
DATED : August 23, 2011  
INVENTOR(S) : Nakayama et al.

Page 1 of 1

It is certified that error appears in the above-identified patent and that said Letters Patent is hereby corrected as shown below:

Column 24, line 38 (claim 1): "PH2<PH1<PH" should read --PH2<PH1≤PH--.  
Column 24, line 40 (claim 1): "PV1<PV2<PV" should read --PV1<PV2≤PV--.

Signed and Sealed this  
Fourteenth Day of February, 2012

David J. Kappos  
*Director of the United States Patent and Trademark Office*